(12) United States Patent
Van Schie et al.

(10) Patent No.: US 12,375,640 B2
(45) Date of Patent: Jul. 29, 2025

(54) METHOD FOR DISPLAYING AN ARTIFICIAL FIRE PATTERN IN AN ARTIFICIAL FIREPLACE

(71) Applicant: NetZero Fireplaces, Inc., Cedar Rapids, IA (US)

(72) Inventors: Michael Petrus Van Schie, Rotterdam (NL); Brian Hok Gwan Khouw, Rotterdam (NL); Sander Martijn Havik, Rotterdam (NL); Beyko Martijn Eli Van Melick, Belfeld (NL)

(73) Assignee: Netzero Fireplaces Inc., Hiawatha, IA (US)

( * ) Notice: Subject to any disclaimer, the term of this patent is extended or adjusted under 35 U.S.C. 154(b) by 0 days.

(21) Appl. No.: 17/421,632

(22) PCT Filed: Jan. 7, 2020

(86) PCT No.: PCT/NL2020/050006
§ 371 (c)(1),
(2) Date: Jul. 8, 2021

(87) PCT Pub. No.: WO2020/145818
PCT Pub. Date: Jul. 16, 2020

(65) Prior Publication Data
US 2022/0132100 A1  Apr. 28, 2022

(30) Foreign Application Priority Data

Jan. 11, 2019  (NL) .................................... 2022380

(51) Int. Cl.
*H04N 13/395* (2018.01)
*F21S 10/04* (2006.01)
(Continued)

(52) U.S. Cl.
CPC .......... *H04N 13/395* (2018.05); *F21S 10/043* (2013.01); *F24C 7/004* (2013.01);
(Continued)

(58) Field of Classification Search
None
See application file for complete search history.

(56) References Cited

U.S. PATENT DOCUMENTS 5,195,820 A * 3/1993 Rehberg ................ F24B 1/1808
428/18
9,459,010 B2 * 10/2016 Asofsky .................. F24C 7/081
(Continued)

FOREIGN PATENT DOCUMENTS

EP    3473934 A1    4/2019
GB    2450084 A     12/2008
(Continued)

*Primary Examiner* — Gelek W Topgyal
(74) *Attorney, Agent, or Firm* — Simmons Perrine Moyer Bergman PLC

(57) ABSTRACT

The present invention relates to a method for displaying an artificial fire pattern in an artificial fireplace. The method comprises the steps of:—providing a first video, which is based on a recorded video of an actual fire pattern of a fire on a physical fireplace element in an actual fireplace,—arranging an artificial fireplace element in an interior of the artificial fireplace, wherein the shape of the artificial fireplace element substantially corresponds to the shape of the physical fireplace element in the actual fireplace,—displaying a first video, in order to create the artificial fire pattern, wherein the first video is, seen along a line of sight, aligned with the artificial fireplace element, such that the artificial fire pattern substantially resembles to the actual fire pattern.

5 Claims, 8 Drawing Sheets

Figure 1:
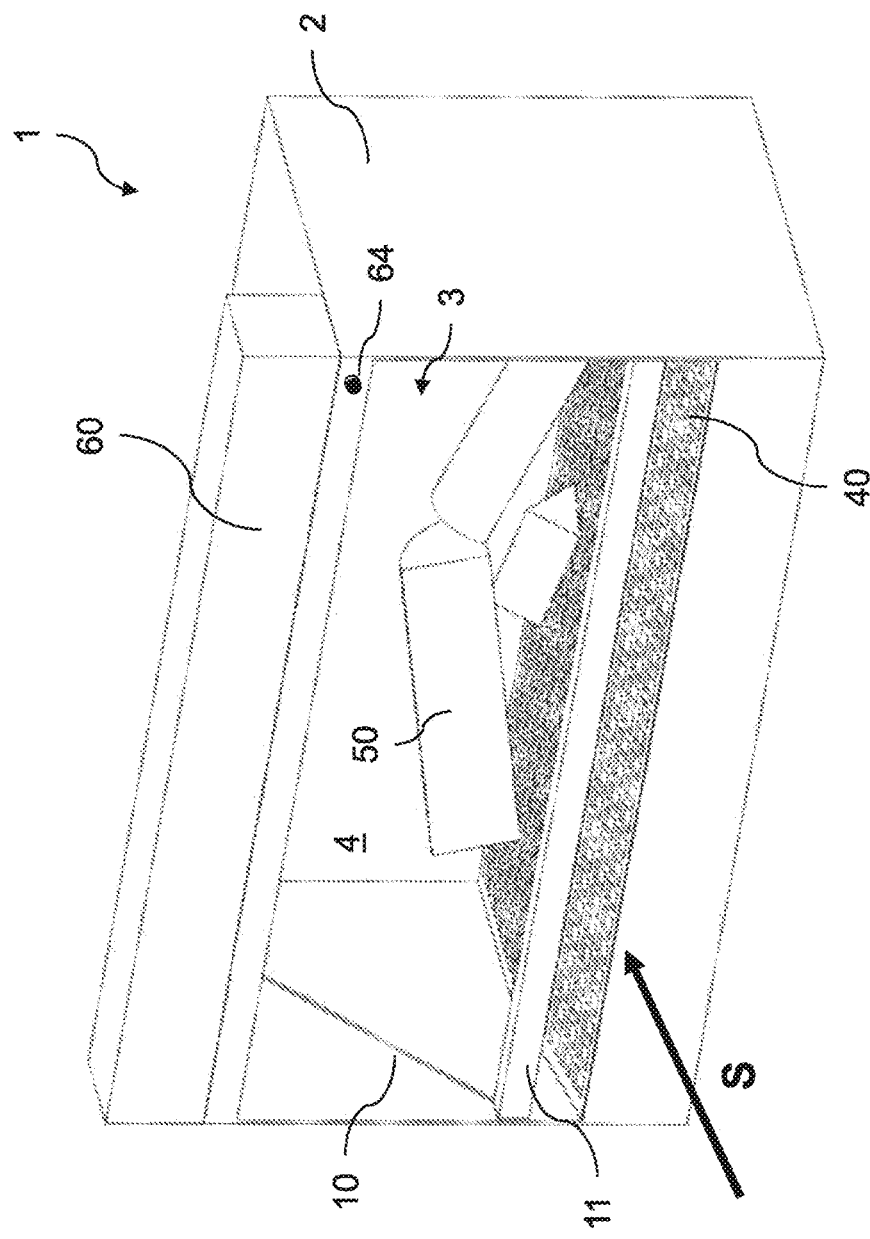

(51) Int. Cl.
*F24C 7/00* (2006.01)
*G11B 27/031* (2006.01)
*H04N 5/262* (2006.01)
*H04N 5/265* (2006.01)
*H04N 5/64* (2006.01)
*H04N 5/91* (2006.01)

(52) U.S. Cl.
CPC ......... *G11B 27/031* (2013.01); *H04N 5/2628* (2013.01); *H04N 5/265* (2013.01); *H04N 5/64* (2013.01); *H04N 5/91* (2013.01)

(56) References Cited

U.S. PATENT DOCUMENTS

| | | | | |
|---|---|---|---|---|
| 9,476,596 | B2* | 10/2016 | Asofsky | F24C 7/082 |
| 2003/0201957 | A1* | 10/2003 | Mix | F24C 7/004 |
| | | | | 345/87 |
| 2005/0252051 | A1* | 11/2005 | Chen | F24C 7/004 |
| | | | | 40/428 |
| 2008/0138050 | A1* | 6/2008 | Moreland | F24C 7/004 |
| | | | | 392/348 |
| 2008/0216366 | A1* | 9/2008 | Purton | F24C 7/004 |
| | | | | 312/204 |
| 2009/0220221 | A1* | 9/2009 | Zhou | F24C 7/004 |
| | | | | 40/428 |
| 2009/0241386 | A1* | 10/2009 | Abileah | G02F 1/1336 |
| | | | | 40/428 |
| 2009/0309711 | A1* | 12/2009 | Adappa | G06Q 30/02 |
| | | | | 340/501 |
| 2011/0088297 | A1* | 4/2011 | Zhu | F24C 7/004 |
| | | | | 40/428 |
| 2013/0233841 | A1* | 9/2013 | Gallo | H04N 5/64 |
| | | | | 219/201 |
| 2016/0327227 | A1* | 11/2016 | Green, Jr. | F21V 23/026 |
| 2018/0010819 | A1* | 1/2018 | Nyhof | F24F 1/0003 |
| 2018/0347818 | A1* | 12/2018 | Birnbaum | F24C 7/004 |

FOREIGN PATENT DOCUMENTS

| | | | | |
|---|---|---|---|---|
| GB | 2484374 A | * | 4/2012 | F21S 10/04 |
| GB | 2484375 A | * | 4/2012 | F21S 10/04 |
| GB | 2502814 A | * | 12/2013 | F21S 10/04 |
| JP | 2006-84169 A | | 3/2006 | |
| RU | 175788 U1 | | 12/2017 | |
| WO | WO-2013110674 A2 | * | 8/2013 | F21S 10/04 |

* cited by examiner

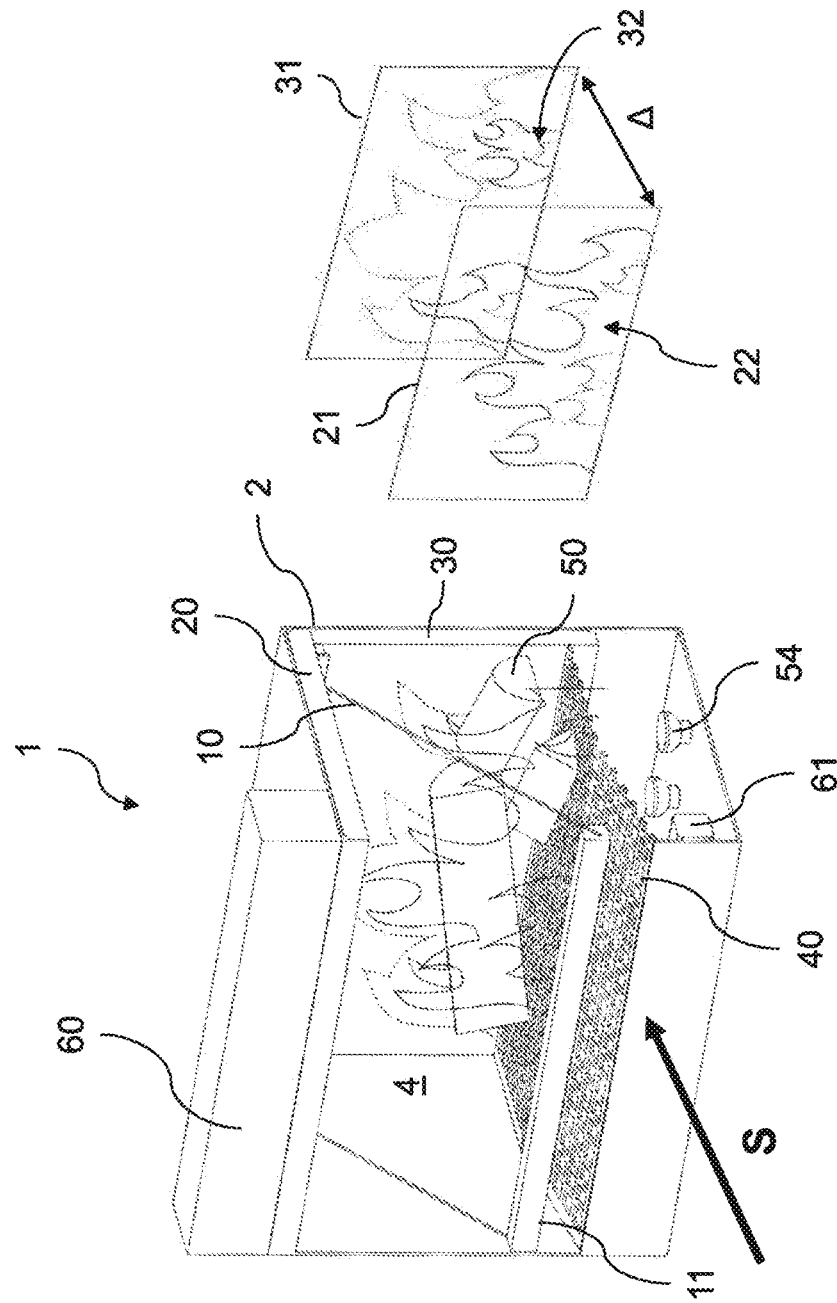

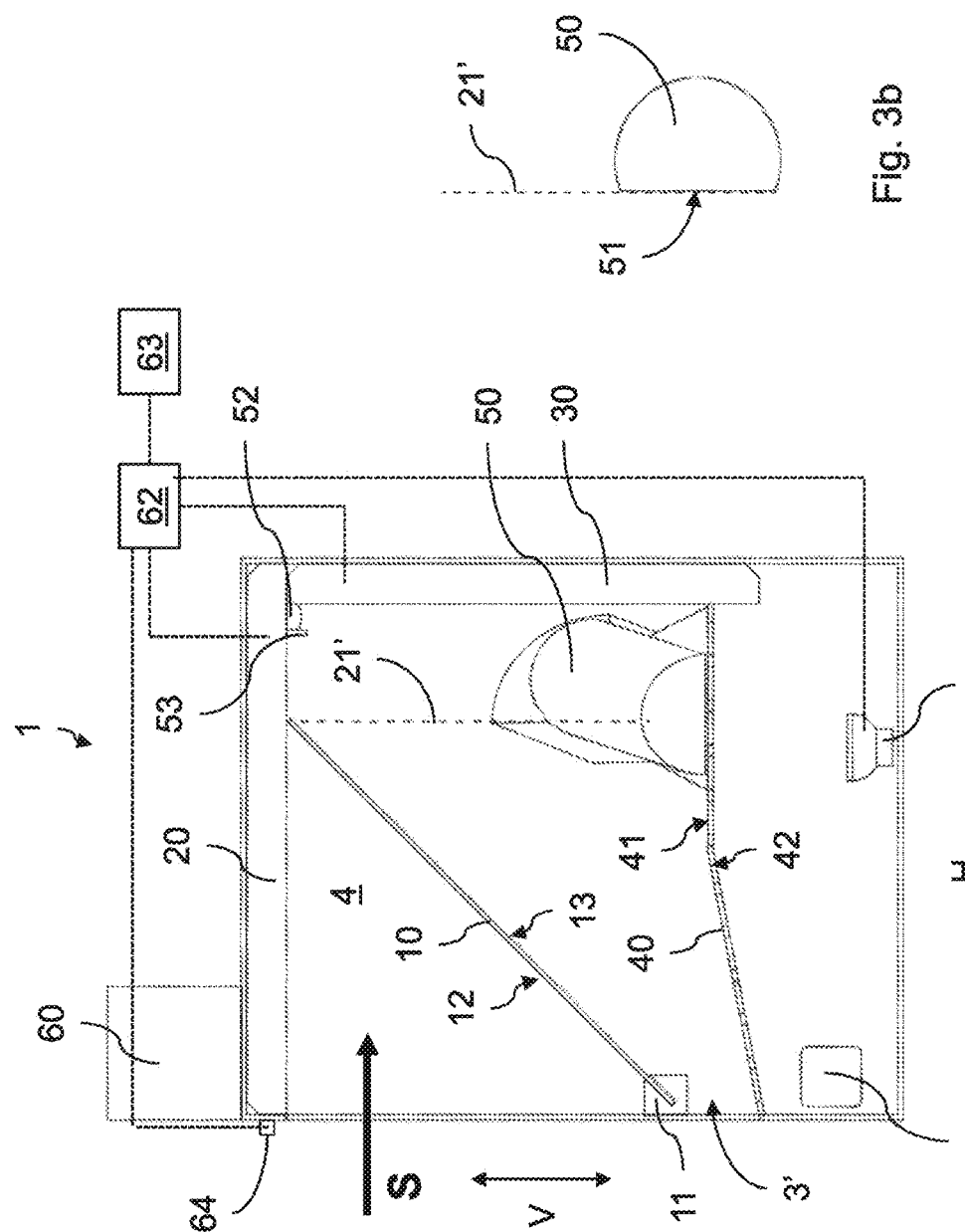

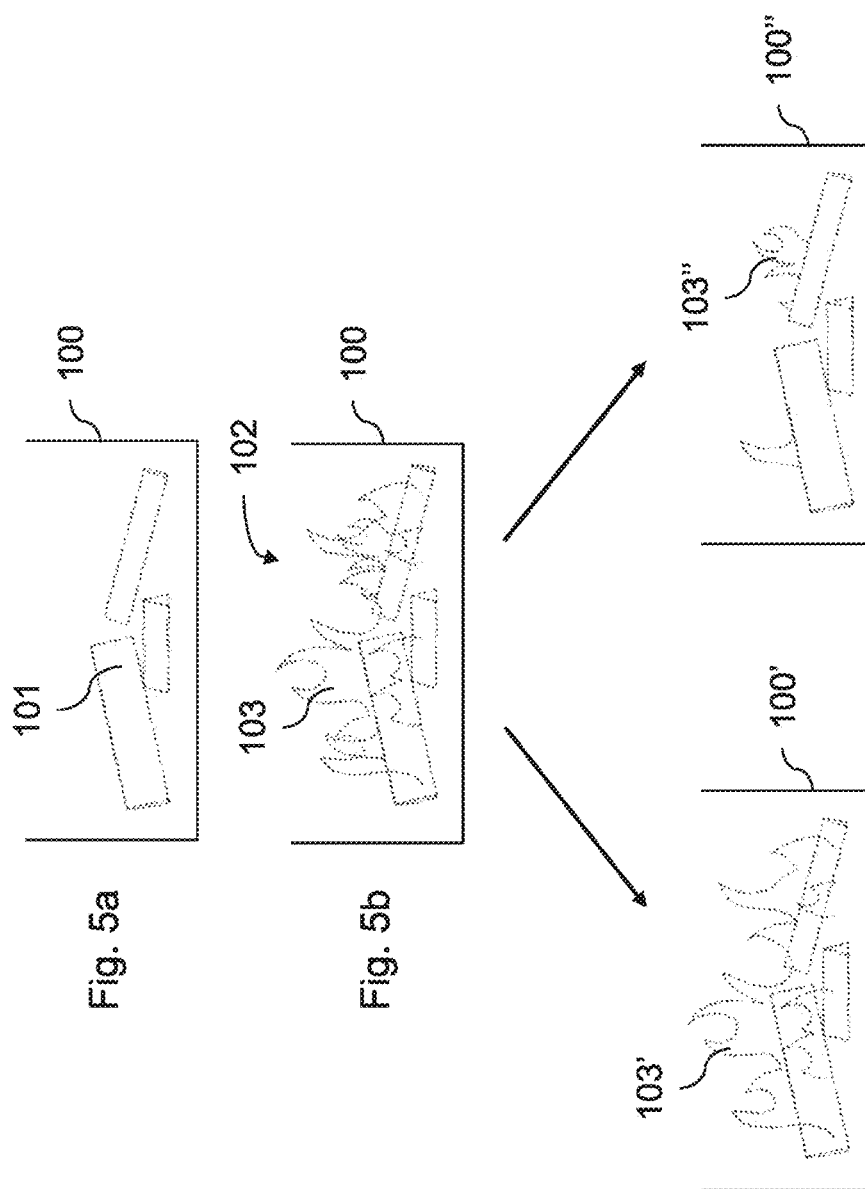

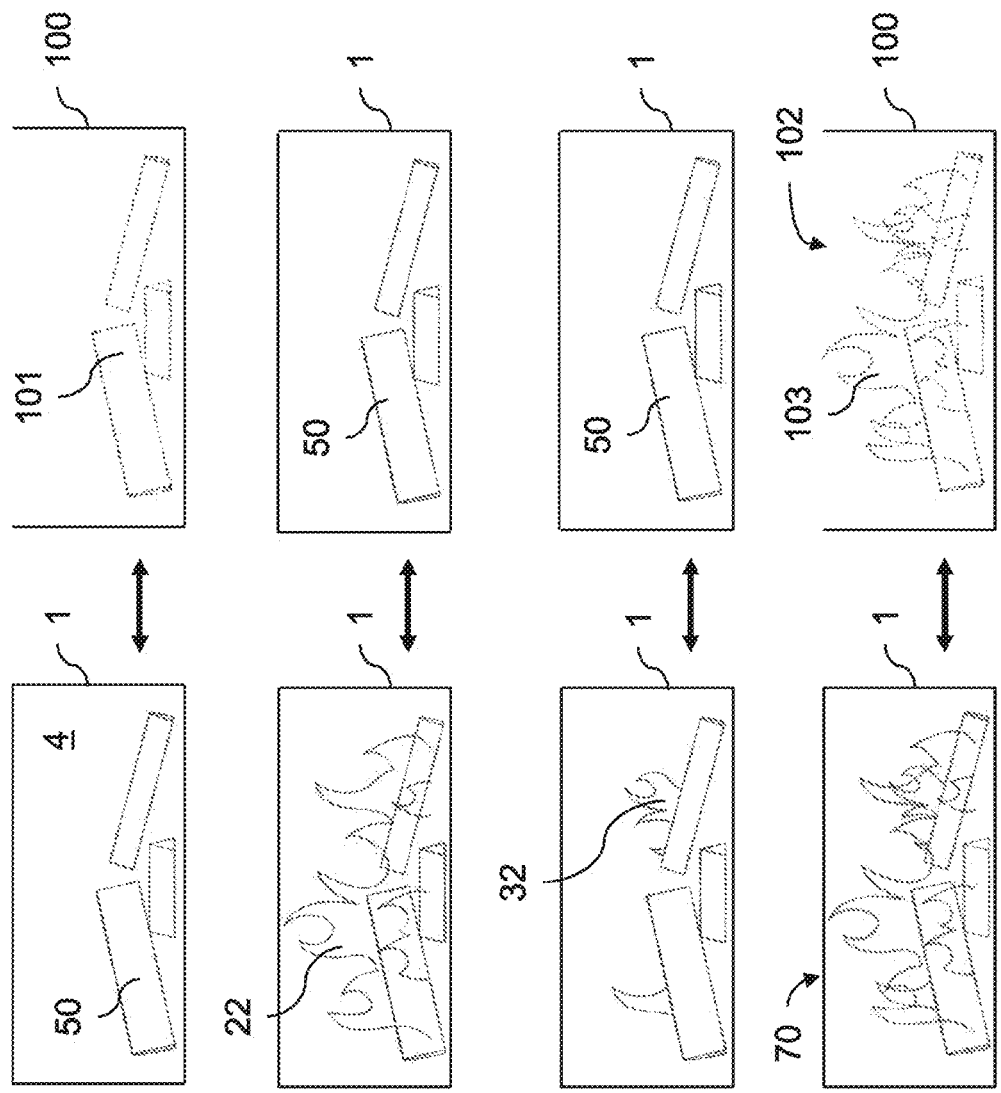

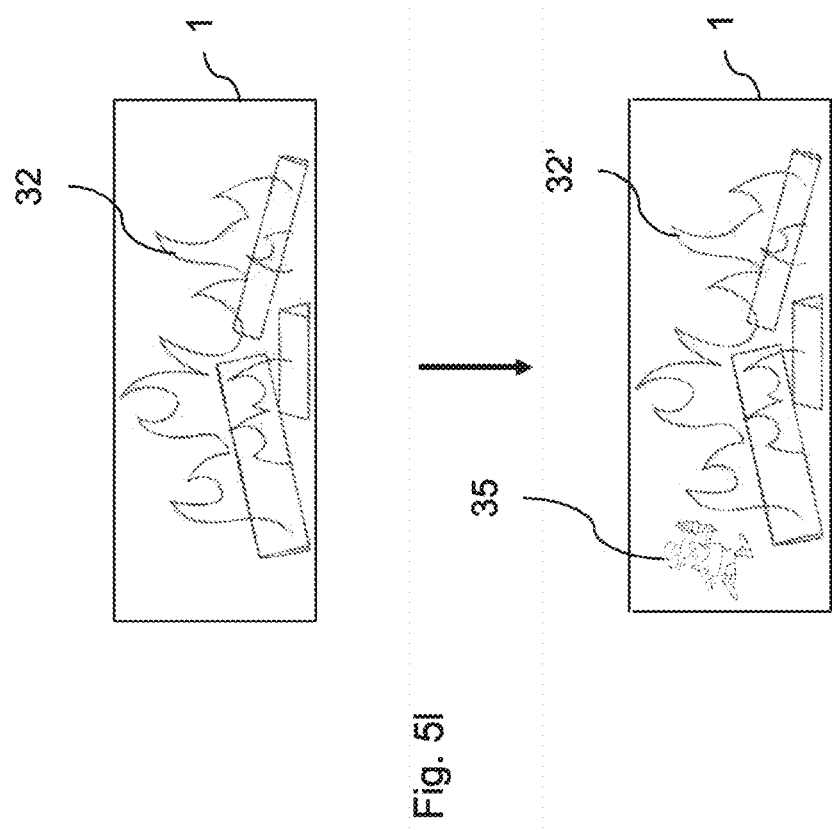

METHOD FOR DISPLAYING AN ARTIFICIAL FIRE PATTERN IN AN ARTIFICIAL FIREPLACE

The present invention relates to a method for displaying an artificial fire pattern in an artificial fireplace. The present invention further relates to a method for providing a video that is configured to be displayed in an artificial fireplace, to a fireplace element assembly for an artificial fireplace and to an artificial fireplace.

Artificial fireplaces are known for some time. Generally, these fireplaces are configured to display a video of a fire, without requiring the presence of an actual fire. These systems may thus be more environmentally friendly, since they do no produce any exhaust fumes, and the systems may be easily placed in existing buildings, without requiring the provision of chimneys or the like.

From U.S. Pat. No. 5,195,820 (A), such a fireplace is known, configured to display simulated flames. This prior art fireplace comprises a housing, in which a simulated fire bed, comprising logs or the like, is arranged. The fireplace further comprises a video projector, configured to project a recorded video of a fire, and a beam-splitting panel. The beam-splitting panel is configured to reflect the projected video of the fire and to emit a combined projection thereof, in which the video of the flames appears to be superimposed on the simulated fire bed.

Despite the fact that this fireplace already simulates an actual fire, without having any emissions, does it still not accurately display an actual fire. Although the imaged flames are intended to be superimposed on the fire bed, is the resulting combined video still not accurate and is it, even for ignorant users, immediately apparent that the projected flames are not realistic.

It is therefore an object of the present invention to provide a method for displaying an artificial fire pattern in an artificial fireplace that is configured to be more realistic or at least to be an alternative artificial fire pattern.

The present invention provides a method for displaying an artificial fire pattern in an artificial fireplace, wherein the method comprises the steps of:

providing a first video, which is based on a recorded video of an actual fire pattern of a fire on a physical fireplace element in an actual fireplace, arranging an artificial fireplace element in an interior of the artificial fireplace, wherein the shape of the artificial fireplace element substantially corresponds to the shape of the physical fireplace element in the actual fireplace, displaying the first video, in order to create the artificial fire pattern, wherein the first video is, seen along a line of sight, aligned with the artificial fireplace element, such that the artificial fire pattern substantially resembles to the actual fire pattern.

With the method according to the invention, the artificial fireplace is designed such, that it accurately resembles a physical fireplace. To do so, the artificial fireplace element in the interior of the artificial fireplace is arranged to substantially correspond to the physical fireplace element in the actual fireplace.

The method according to the present invention may be carried out in an artificial fireplace that comprises both a first display device and a second display, to respectively display a first video and a second video. However, the method should not be considered limited to use in such an artificial fireplace, and could for example also be carried out in an artificial fireplace that comprises a single display device.

The actual fireplace may, in an embodiment, be a conventional fireplace, in which wooden logs are provided to form a physical fireplace element, which are to be burned to create a wood fire.

In an alternative embodiment, the actual fireplace may be a gas hearth in which a gas fire is to be created. The gas fire may be present on top of the physical fireplace element, which may for example be embodied to accurately mimic a set of wooden logs, but which comprises in fact flame resistant elements that may have internal gas channels to guide flammable gasses towards a location where they are intended to be ignited.

For both examples of the actual fireplace, the physical fireplace element may comprise element parts, which are stacked on top of each other to form the artificial fireplace. The element parts may for example resemble wooden logs, which may be stacked to resemble the fire bed of a wood fire and which may be connected to each other to form the physical fireplace element.

The physical fireplace element is arranged in a certain shape. The shape of the physical fireplace element may for example comprise the relative orientations of element parts and/or the individual shape of the element parts. The physical fireplace element is furthermore arranged at a certain location in the actual fireplace.

In the method according to the present invention, the artificial fireplace element is arranged in the interior of the artificial fireplace, to substantially mimic the physical fireplace element in the actual fireplace. The shape of the artificial fireplace element thereby substantially corresponds to the shape of the physical fireplace element, whereas the shape of the interior of the artificial fireplace may substantially correspond to the shape of the actual fireplace.

In the actual fireplace, a video is recorded from the fire that is created on the physical fireplace element. In the recorded video, an actual fire pattern is imaged, which represents the actual fire that is present on the physical fireplace element. The recorded actual fire pattern may for example comprise flames or may comprise a glow effect that may be visible on an inner wall of the actual fireplace, being caused by illumination from the flames of the actual fire. The fire in the actual fireplace may, for example, be a wood fire that is present on wooden logs, or may be gas fire.

The method comprises the step of providing the first video, which is to be displayed in the artificial fireplace. The first video is based on the recorded video, which means that the content in the first video is at least partially obtained from the recorded video. Hence, the actual fire pattern in the first video may at least partially be obtained from the actual fire pattern in the recorded video. The content in the first video may for example only comprise flames that originate from a certain area in the actual fireplace, e.g. flames originating from a front portion, whereas another part of the recorded video, e.g. flames originating from a rear portion in the actual fireplace, are not incorporated in the first video.

The first video is displayed in the artificial fireplace, such that it is visible for users, when seen along a line of sight. This line of sight may be any line along which a user is able to look into the interior of the artificial fireplace and along which the user is able to see the displayed first video, either directly or indirectly. Along the line sight, the displayed video creates an artificial fire pattern, which may be defined as the pattern that is visible for the users when the video is displayed in the artificial fireplace. The artificial fire pattern may for example comprise a displayed image of the flames in the first video, being visible along the line of sight.

Furthermore, the first video is aligned with the artificial fireplace element in the interior of the artificial fireplace, in order to achieve that the displayed flames in the first video and the artificial fireplace element in the interior of the artificial fireplace together form an artificial fire pattern that is visible along the line of sight. With the term aligned, it is meant that the artificial fireplace element and the displayed flames, or at least the relative locations thereof, are positioned such that a combined image of the artificial fireplace element and the displayed flames accurately corresponds to the flames on the physical fireplace element in the actual fireplace. As such, it appears as if the displayed flames actually originate from a fire on the artificial fireplace element in the artificial fireplace.

An advantage of the alignment is that the flames in the displayed first video actually appear to originate from the artificial fireplace element, even though there is no actual fire present in the artificial fireplace. Hence, a user would consider that the combination of the actual fire pattern in the first video and the aligned artificial fireplace element, together forming the artificial fire pattern, accurately resembles the actual fire pattern that he would see in the actual fireplace.

As such, the method according to the present invention provides for a more realistic representation of an artificial fireplace and allows the artificial fireplace to more accurately resemble an actual fireplace, without having any disadvantageous emissions or fuel consumption.

In an embodiment, the method further comprises the steps of:

providing a second video, which is based on the recorded video of the actual fire pattern and which differs from the first video, displaying the second video, wherein the second video is, seen along the line of sight, aligned with the artificial fireplace element and/or with the first video.

This embodiment of the method comprises the provision and display of a second video, which is also based on the recorded video. The second video may be obtained similarly as the first video, for example being extracted from the recorded video.

However, the second video preferably differs from the first video and the second video may comprise an actual fire pattern that is at least partially obtained from the recorded video. The actual fire pattern in the second video may for example represent flames that originate from a rear portion in the actual fireplace, whereas the actual fire pattern in the first video may thereby represent flames that originate from a front portion in the actual fireplace.

The second video is also displayed in the artificial fireplace and preferably, the displaying of the second video is synchronized with the first video.

The second video is aligned with the first video and/or with the artificial fireplace element, at least when seen along the line of sight. For the user, the combination of the second video, first video and artificial fireplace element, seen along the line of sight, accurately corresponds to what the user would see when he would look into the actual fire on the physical fireplace element in the actual fireplace.

In a further embodiment, the second video further comprises a video of a glow effect of the fire on a background of the actual fireplace, which is based on the recorded video of the actual fire pattern, and wherein the video of the glow effect is, seen along the line of sight, aligned with the artificial fireplace element and/or with the first video.

The second video thereby comprises an actual fire pattern that not only comprises video content of the flames of the actual fire, but, in addition, the glow effect in the second video represents illumination of a background wall of the actual fireplace, being induced by the actual fire.

Hence, the glow effect may comprise flickering and/or shadows that appear to be projected on the background wall. The video of the glow effect is comprised in the second video, and is as such aligned with the flames of the actual fire pattern in the second video. The second video, with the video of the glow effect, is additionally aligned with the first video and/or with the artificial fire element. The realism of the displayed artificial fire pattern is thereby further improved.

In an embodiment of the method, the artificial fireplace comprises a first display device for displaying the first video and/or a second display device for displaying the second video, and at least one of the first display device and the second display device is, seen along the line of sight, set at a similar depth within the artificial fireplace as the artificial fireplace element.

According to this embodiment, the display devices have a plane from which the first video or the second video originates, or at least appears to originate. The display devices may thereby be themselves arranged in this plane, or the plane may be a virtual plane, in case the first video or the second video is at least partially reflected.

The plane of the display devices intersects the artificial fireplace element. As such, it appears that the flames in the first videos or the second video are present on the artificial fireplace element, as if an actual fire were to be present in the artificial fireplace.

In an embodiment, the first video is aligned by means of the step of:

processing the first video by means of digital video editing, for shifting the position of the actual fire pattern in the first video.

Alternatively or additionally, the second video is aligned by means of the step of:

processing the second video by means of digital video editing, for shifting the position of the actual fire pattern in the second video.

According to this embodiment, the alignment between the videos and the artificial fireplace element takes place by digitally editing the videos, for example by means of digital video processing software. The alignment constitutes of shifting the position of the actual fire pattern in the first video and/or the second video, in order to effect a shift in position between the actual fire pattern and the artificial fireplace element, when the first video and/or the second are displayed in the artificial fireplace. This digital editing may be advantageous, since it does not require physically displacing the artificial fireplace element within the artificial fireplace, nor does it require displacing the first display device and the second display device within the artificial fireplace.

Accordingly, the alignment can be done more easily, since it does not require shifting of elements by installers or end users, as alignment rather takes place when the videos are processed. Furthermore, the artificial fireplace can be provided more reliably, since the artificial fireplace element and the display devices can be mounted rigidly in the interior of the artificial fireplace and cannot be undesirably moved out of alignment during transport or by ignorant users after installation.

In an embodiment, the method may comprise the step of:

shifting the position of the artificial fireplace element in the interior of the artificial fireplace, and/or adapting a location from which the first video and/or second video is displayed, and/or processing the first video and/or the second video in order to adapt the position of the actual fire pattern in the first video and/or the actual fire pattern in the second video, in order to align the first video and/or the second video, seen along the line of sight, with the artificial fireplace element.

The steps in this embodiment of the method may be either carried out individually or in combination, and may have the effect that the first and second videos are aligned with respect to each other and with respect to the artificial fireplace element.

The first alternative step of the method according to this embodiment may comprise the shifting of the position of the artificial fireplace element within, and with respect to the housing of the artificial fireplace. The artificial fireplace element is thereby shifted with respect to display means that may display the first video and/or the second video, which are substantially rigidly connected to the housing of the artificial fireplace. For carrying out this alternative step, the housing of the artificial fireplace may comprise an alignment device, which is configured to mate with a complementary alignment device of the artificial fireplace element, which are together configured to ensure accurate alignment.

In the second alternative of the method according to this embodiment, a display position of the first video and/or the second video may be adjusted, and may preferably adjusted with respect to the artificial fireplace element. This may, for example, be done by changing a position of the display means that may display the first video and/or the second video, so as to achieve that the first video and/or second video are displayed from a different location in the artificial fireplace, and that the first video and/or second video may become aligned more accurately with respect to each other and with respect to the artificial fireplace element.

In the last alternative of the method according to this embodiment, the first video and/or the second video may be processed, for example by means of video processing software, such that the position of the actual fire patterns is shifted within the video. This means that, for example, the position of the flames in the first video is shifted within the frame of the video, so that the flames appear to originate from a different location, once displayed in the artificial fireplace. It is, as such, possible to adjust a position where a user sees the actual fire pattern in the first video and/or the second video, without requiring the shifting of the position from which the first video and/or the second video is displayed, e.g. without requiring the shifting of display means.

In an embodiment of the method, wherein the step of providing the first video and/or the step of providing the second video each comprises providing of multiple first videos and/or second videos, which have been extracted from respective recorded videos of a fire in the actual fireplace at multiple different fire settings, the method further comprises the steps of:

setting at least one parameter for the artificial fire pattern, selecting one or more fire settings that correspond to the at least one set parameter, selecting the one or more first videos and/or the one or more second videos that are associated with the selected one or more fire settings, processing the selected one or more first videos to form a combined first video and/or processing the selected one or more second videos to form a combined second video, and displaying the combined first video and/or displaying the combined second video.

According to this embodiment, a plurality of first videos and second videos may be provided, which are respectively associated with a selected fire setting for a fire. For example, the videos have been extracted from respective recorded videos of a gas fire in the actual fireplace at multiple different gas fire settings, wherein the gas fire settings form fire settings for the gas fire that is provided in the actual fireplace.

The gas fire setting may, for example, comprise a value for a flow of gas that is burned by the fire, wherein a high gas fire setting corresponds to a large gas supply and a large gas fire and wherein a low gas fire setting corresponds to a small gas supply and a small gas fire.

In the present embodiment, the first videos and the second videos have been extracted from respective recorded video of the fire at selected fire settings. Each of these first videos and second videos thereby comprises a different actual fire pattern, each for example corresponding to a different size of the fire.

According to this embodiment, a user may set a parameter for the artificial fire pattern. This parameter represents the artificial fire pattern that is displayed in the artificial fireplace and may, for example, represent a size and/or intensity of the displayed fire.

Then, one or more fire settings are selected, of which the resulting actual fire corresponds to the desired size and/or intensity of the artificial fire pattern that is selected by setting the parameter for the artificial fire pattern.

In case only a single fire setting is selected and found to correspond to the set parameter, the associated first video and second video are displayed in the artificial fireplace. The actual fire patterns in the first video and the second video thereby together form an artificial fire pattern that accurately corresponds to the desired artificial fire pattern for which the parameter has been set.

According to this embodiment, the fire in the actual fireplace may as well be a wood fire, which may be subject to certain conditions, such as a certain air flow towards the fire. The conditions for the wood fire may thereby form the fire settings, at least in case the fire in the actual fireplace were to be a wood fire Alternatively, there is no single fire setting that corresponds to the set parameter, but the set parameter could correspond to a value that is in between multiple fire settings. Here, multiple first videos and second videos, corresponding to the multiple fire settings, are processed to form a combined first video and a combined second video. The processing may also comprise the editing by means of video processing software, and may result in combined videos of which the intensity and/or size of the actual fire pattern is arranged in between the individual intensities and/or sizes of the multiple first videos and second videos, for example forming weighted averages of the multiple first videos and second videos. The combined first video and combined second video are then displayed to obtain the desired artificial fire pattern.

In an embodiment, the method further comprises the step of illuminating the artificial fireplace element with at least one first light source. The at least one first light source may, seen along the line sight, be arranged behind the semi-transparent mirror, such that its emitted light illuminates the artificial fireplace element without being obstructed by any element in between the at least one first light source and the artificial fireplace element. For example, the at least one first light source can be embodied as a strip of LEDs across a substantial part of the width of the interior of the artificial fireplace, e.g. the entire width thereof. The strip of LEDs may be provided against the ceiling of the housing, behind the semi-transparent mirror, As such, the artificial fireplace element is illuminated from across a substantial part of the overall width, in order to improve the realism of the illumination of the artificial fireplace element.

In a further embodiment, the illuminating of the artificial fireplace element comprises the illuminating with a flickering effect The flickering effect may for example comprise the illumination by means of emitted light that has a wavelength in the visible regime, for example having a red, orange or yellow colour for resembling the light that is emitted by actual flames in an actual fireplace. The flickering effect may alternatively or additionally comprise the varying of an intensity of the light that is emitted, in order to resemble the varying intensity of light that is emitted by actual flames in an actual fireplace.

In an embodiment, method comprises the displaying of a status signal with the first display device and/or the second display, wherein the status signal is, for a user, visible along the line of sight. The status signal may comprise a certain setting of the artificial fireplace, which is to be communicated to the user by means of the status signal.

For example, the status signal comprises information about a fire setting of the artificial fireplace, which may be representative for an intensity of the displayed artificial fire pattern. Furthermore, the status signal may represent the status of a sound signal, such as the volume thereof, or the intensity of light that illuminates an artificial fireplace element within the artificial fireplace. The status signal may thereto be embodied as a number that is displayed in the first video or the second video, for example just after the corresponding setting of the artificial fireplace has been changed by the user.

The present invention further provides a method for providing a video that is configured to be displayed in an artificial fireplace by means of a method that is described above, wherein the method comprises the steps of:

arranging a physical fireplace element in an actual fireplace, creating a fire on the physical fireplace element, recording a video of an actual fire pattern of the fire, and extracting at least the first video and/or the second video from the recorded video.

With this method, a video may be obtained that is configured to be displayed in an artificial fireplace and to be aligned with an artificial fireplace element in the artificial fireplace. The provided video is recorded from an actual fire on a physical fireplace element in an actual fireplace, wherein the physical fireplace element in the actual fireplace has a certain shape and wherein the artificial fireplace element in the artificial fireplace is intended to be arranged such, that its shape and its position within the housing of the artificial fireplace substantially corresponds to the shape and position of the physical fireplace element in the actual fireplace.

After the physical fireplace element has been arranged in the actual fireplace, a fire is created thereon and the resulting actual fire pattern is recorded to form a recorded video. The recorded video then forms the basis for a first video and/or a second video, which may be extracted from the recorded video.

The extracting may, for example, be carried out by means of video processing software and may comprise the decomposing of a first video, which comprises a first actual fire pattern of the actual fire, and of a second video, which comprises a second actual fire pattern of the actual fire. Preferably, the first actual fire pattern differs at least partially from the second actual fire pattern, so that a user would note that a portion of the displayed artificial fire pattern originates from the first video and that another portion thereof originates from the second video.

In a further embodiment, the first video comprises a glow effect, which is projected on the artificial fireplace element. According to this embodiment, the step of arranging the physical fireplace element in the actual fireplace comprises the arranging of physical fireplace element that has a black frontal surface. Such a black frontal surface reduces the visibility of the physical fireplace element in the recorded video of the actual fireplace, which is advantageous, since it is not desired to also display images of the fireplace element in the projected video. Hence, such an artificial fireplace element is already visible in the interior of the artificial fireplace and therefore not needs to be projected.

According to this embodiment, the step of extracting the first video further comprises the extracting of light that is emitted by the glowing of the physical fireplace element under the influence of the actual fire. The first videos thereby comprises flames and a glowing effect, which are to be displayed simultaneously, in order to mimic burning of the artificial fireplace element, and the glowing as a result of this artificial burning.

Alternatively, the step of extracting the first video further comprises the removing of the physical fireplace elements from the first video. Such removal may concern processing of the extracted first video, in order to remove images of the physical fireplace element therefrom. This processing may for example take place by means of digital video editing.

In an embodiment, the method further comprises the step of:

processing the first video in order to shift the position of the actual fire pattern in the first video, wherein the processing takes place by means of digital editing of the first video.

Alternatively or additionally, the method further comprises the step of:

processing the second video in order to shift the position of the actual fire pattern in the second video, wherein the processing takes place by means of digital editing of the second video.

According to this embodiment, the videos are processed by digitally editing the videos, for example by means of digital video processing software. The processing constitutes of the shifting the position of the actual fire pattern in the first video and/or the second video, in order to effect a shift in position between the actual fire pattern and the artificial fireplace element, when the first video and/or the second are displayed in the artificial fireplace. This processing may be advantageous, since it allows for omission of physically displacing the artificial fireplace element within the artificial fireplace, nor does it require displacing the first display device and/or second display device within the artificial fireplace.

Accordingly, the alignment by means of processing the videos can be done more easily, since it does not require shifting of elements by installers or end users. Furthermore, the artificial fireplace can be provided more reliably, since the artificial fireplace element and the display devices can be mounted rigidly in the interior of the artificial fireplace and cannot be undesirably moved out of alignment during transport or by ignorant users after installation.

In an embodiment, the method for the providing of the video comprises the steps of:
a) creating a fire in the actual fireplace at a selected fire setting,
b) recording a video of the actual fire pattern that corresponds to the selected fire setting,
c) extracting at least the first video and/or the second video from the recorded video,
d) storing the respective at least one extracted video,
e) storing the associated selected fire setting, and
f) repeating steps a)-e) for multiple different fire settings.

According to this embodiment, the actual fireplace may for example be a gas hearth and the fire that is created in the actual fireplace may be a gas fire, which is created on the physical fireplace element, and the fire setting may be a gas fire setting. The gas fire is created at a plurality of gas fire settings, wherein the gas fire setting may correspond to a flow of gas that is burned by the gas fire. Accordingly, the multiple difference gas fire settings will result in multiple corresponding gas fires, having multiple different sizes and/or intensities.

According to this embodiment, a video is recorded from the fire at each of the multiple fire settings. From each of these recorded videos, a first video and a second video are extracted. The extracted first videos and second videos are stored, together with their associated fire setting.

For displaying the artificial fire pattern, having a parameter selected for the desired size or intensity thereof, the first video and second video that are associated with the corresponding fire setting may then be easily retrieved and displayed by means of the artificial fireplace.

Alternatively, the different first and second videos may also be obtained by means of processing of the videos. For example, the actual fire patterns in the first and second videos may be adapted by means of video processing software, to, for example, resize the actual fire patterns or to digitally adjust the intensity of the actual fire patterns.

According to this embodiment, the created fire in the actual fireplace may also be a wood fire, which may be subject to certain conditions, such as a certain air flow towards the fire. The conditions for the wood fire may thereby form the fire settings, at least in case the fire in the actual fireplace were to be a wood fire.

In an embodiment of the method, the step of extracting comprises the extracting of a first video, which is configured to be displayed with a first display device of the artificial fireplace. The actual fire pattern in the at least one first video thereby resembles recorded flames that originate from a first area in the actual fire.

In the actual fire, flames may be present on the entire physical fireplace element and therefore throughout the actual fireplace. The recorded video therefore comprises an actual fire pattern that comprises all flames from the entire actual fire, e.g. from across the entire width of the actual fireplace and across the entire depth, seen along the line of sight. The actual fire pattern in the recorded video may for example comprise flames that originate from a front portion of the actual fireplace, and from a rear portion that is located behind the front portion, seen along the line of sight.

It may, however, be desired to not show all flames of the actual fire pattern of the recorded video in the first video. To do so, the method according to this embodiment thereby allows that the first video, which is extracted from the recorded video, has an actual fire pattern that comprises only a part of the artificial fire pattern of the recorded video.

The actual fire pattern in the extracted first video may thereby only resemble recorded flames from a first area in the actual fire. The first area spans a portion of the actual fireplace, which means that the extracted first video may not comprise all flames that are in the actual fire pattern of the recorded video.

The first area may be defined as a region in the actual fire. The first area is an area that may, seen along a line of sight, be provided in between a first depth and a second depth into the actual fire. The first area may further extend across the entire width of the actual fire.

The first area may be a proximal area in the actual fireplace, being located at a front portion thereof. The first display device may be arranged accordingly in a front portion of the artificial fireplace. The displayed first video may thereby display flames that would appear to originate from a front portion of the artificial fireplace and the flames may appear to burn on a front portion of the artificial fireplace element.

The extracting of the first video may for example comprise the step of assigning a depth value to the flames in the actual fire pattern in the recorded video, wherein the depth value represents the depth into the actual fireplace and the location on the physical fireplace element from which the respective flame originates. The extracting may then further comprise the step of filtering the flames of which a depth value falls within the first area, which is defined between the first depth and the second depth into the fire, seen along a line of sight. Finally, the first extracted video may be composed of the filtered flames.

The extracting of the first video may for example be carried out automatically by means of video processing software, but may as well be carried out by a human video editor, who may make use of video processing software as well.

In an additional or alternative embodiment, the step of extracting comprises the extracting of a second video, which is configured to be displayed by means of a second display device of the artificial fireplace. The actual fire pattern in the second video resembles recorded flames that originate from a second area in the fire and the second area is, seen along a line of sight, spaced at a distance with respect to the first area.

The second video may thereby comprise an actual fire pattern of which the flames originate from a second area in the actual fire, which differs from the first area. The actual fire pattern in the extracted second video may therefore differ from the actual fire pattern in the extracted first video. The second video may be displayed in an artificial fireplace with a second display device, wherein a location of the second displayed device may differ from the location of the first display device.

The second area may be defined accordingly between a third depth and a fourth depth, wherein the third depth and fourth depth are, along the line of sight, set further away than the first depth and the second depth. The second area may further extend across the entire width of the actual fire.

The second area in the actual fire may correspond to a distal depth region in the actual fireplace, being located at a rear portion thereof. The second display device may be arranged accordingly in a rear portion of the artificial fireplace. The displayed second video may thereby display flames that would appear to originate from a rear portion of the artificial fireplace and the flames may appear to burn on a rear portion of the artificial fireplace element.

The extracting of the second video may also comprise the step of assigning a depth value to the flames in the actual fire pattern in the recorded video. The extracting may as well comprise the step of filtering the flames of which a depth value falls within the second area, which is defined between the third depth and the fourth depth into the fire, seen along a line of sight. The second extracted video may be composed of the filtered flames, but may as well comprise a video of a glow effect of the actual fire on the background of the actual fireplace.

The extracting of the second video may also be carried out automatically by means of video processing software, or by a human video editor.

In an embodiment, the method further comprises the step of merging the extracted first video and/or the extracted second video with an additional video and/or an additional image. With this step, an additional video and/or and additional image may be added to the extracted videos. The additional video or image may overlay the respective actual fire patterns in the extracted videos and may for example comprise technical information of the artificial fireplace, such as a settings menu, or may for example comprise advertising content.

In an embodiment, the extracted first video and/or the extracted second video are configured to be displayed as the artificial fire pattern in the artificial fireplace, which comprises a semi-transparent mirror, a first display device to display the first video towards a first side of the semi-transparent mirror, and/or a second display device to display the second video towards an opposite second side of the semi-transparent mirror, wherein the semi-transparent mirror is arranged to at least partially reflect the first video at its first side and/or to at least partially transmit the second video at its second side, in order to recombine the first video and/or the second video into the artificial fire pattern, such that the artificial fire pattern is visible along a line of sight.

Such an artificial fireplace is configured to display the artificial fire pattern by means of a so-called Pepper's ghost projection, in which the displayed first video is at least partially reflected on the first side of the semi-transparent mirror, whereas the displayed second video is at least partially transmitted on the second side of the semi-transparent mirror. The semi-transparent mirror is thereby configured to recombine both videos. The first vide is displayed a hologram-like manner such, that it appears that the first video originates from a virtual plane, which is arranged in front of the plane from which the second video originates.

This difference in depth between the displayed first video and the displayed second video, which both comprise a different actual fire pattern, gives rise to a layered effect in the displayed artificial fire pattern and to a more realistic representation by the artificial fireplace.

In an embodiment of the method, the artificial fireplace comprises a first display device, which may be arranged in the interior of the housing at a location above the semi-transparent mirror. With the term above, it is meant that in an installed configuration of the artificial fireplace, the first display device is arranged higher than the semi-transparent mirror, but at least partially in the same horizontal plane.

In this embodiment, the first display device may be configured to display the flames in the first video in a downward direction onto the first side of the semi-transparent mirror, where the first video is at least partially reflected. The reflected first video emitted along the line of sight and a user may see the flames in the first video and the artificial fireplace element, as if an actual fire were to be present on the artificial fireplace element.

The present invention further provides a fireplace element assembly for an artificial fireplace, comprising:

an artificial fireplace element,
a digital storage device,
at least one first video, which is at least temporarily stored on the digital storage device,
wherein the shape of the artificial fireplace element substantially corresponds to the shape of a physical fireplace element in an actual fireplace, wherein the at least one first video is extracted from at least one recorded video of an actual fire pattern of a fire on the physical fireplace element in the actual fireplace, and wherein the actual fire pattern in the at least one first video resembles recorded flames that originate from a first area in the fire.

The fireplace element assembly comprises an artificial fireplace element, which has a certain shape and which may comprise element parts, which are arranged in a certain stacked configuration and which are connected to each other to form the artificial fireplace element. The assembly further comprises at least one video, which comprises an actual fire pattern that is based on a recorded video of an actual fire on physical fireplace elements in an actual fireplace. The shape of the artificial fireplace elements corresponds to the shape of the physical fireplace element, which means that a resulting artificial fire pattern, when this first video were to be displayed in an artificial fireplace in which this artificial fireplace element were to be arranged, accurately resembles the actual fire in the actual fireplace.

The fireplace element assembly may be sold as a replacement set for an existing artificial fireplace. If, for example, a user gets tired of the artificial fire pattern that is displayed by his own artificial fireplace, he does not need to replace the entire fireplace. He may rather acquire a new fireplace element assembly, of which the artificial fireplace element has a different shape than his existing one and of which the first video will differ accordingly. The replacement assembly will, once installed in the artificial fireplace, provide a different displayed artificial fire pattern and may therefore give a very different impression to the user, without requiring replacement of the entire artificial fireplace.

In an embodiment of the fireplace element assembly, the first video is processed by means of digital video editing, for shifting the position of the actual fire pattern in the first video.

In an embodiment, the fireplace element assembly comprises at least one second video, which is at least temporarily stored on the digital storage device, wherein the at least one second video is extracted from the at least one recorded video of the actual fire pattern, and wherein the actual fire pattern in the at least one second video resembles recorded flames that originate from a second area in the fire, and wherein the second area is, seen along a line of sight, spaced at a distance with respect to the first area.

In this embodiment, the fireplace element assembly is configured to be installed in an artificial fireplace that comprises two display devices, in order to display both the first video and the second video.

The first video and the second video may be provided by extracting them from a recorded video of an actual fire, in which the first video and the second video display different respective actual fire patterns, which respectively resemble flames of the actual fire that originate from the first area and the second area.

In a further embodiment of the fireplace element assembly, the second video is processed by means of digital video editing, for shifting the position of the actual fire pattern in the second video.

In a further embodiment, the fireplace element assembly further comprises:

a plurality of first videos, wherein each of the first videos is extracted from a respective recorded video of an actual fire pattern of a fire in the actual fireplace at a respective one of multiple fire settings for the fire, and a plurality of second videos, wherein each of the second videos is extracted from a respective recorded video of an actual fire pattern of the fire in the actual fireplace at a respective one of multiple fire settings for the fire.

Similar as is described above, may the storage comprise a plurality of first videos and second videos, which have been respectively extracted from recorded videos of an actual fire at different fire settings. As such, any replacement fireplace element assembly may also be used in an artificial fireplace that allows for the setting of a parameter for the displayed artificial fire pattern.

In a further embodiment, the recorded video comprises the actual fire pattern of a gas fire at a respective one of multiple gas fire settings. The first videos and the second videos thereby comprises at least a portion of the actual fire pattern of the gas fire.

Alternatively, the fireplace element assembly comprises a first video and a second video, which are both extracted from a recorded video of an actual fire pattern on a fire in the actual fireplace. The fire is thereby preferably a wood fire that has been created on wooden logs and the artificial fireplace element of the fireplace element assembly thereby preferably resembles the wooden logs in the actual fireplace.

In a further embodiment, the fireplace element assembly may comprise an alignment device, which is configured to mate with a substantially corresponding alignment device in a housing of an artificial fireplace assembly. The alignment device is thereby configured to ensure a relative position between the artificial fireplace element and the housing of the artificial fireplace, in order to secure the artificial fireplace element in an aligned position with the displayed first video and second video, during displaying of the artificial fire pattern with the artificial fireplace.

The present invention further provides an artificial fireplace, for displaying an artificial fire pattern, comprising:

a housing, defining an interior and comprising at least one opening to allow a line of sight into the interior of the housing, a semi-transparent mirror, which is arranged in the interior of the housing and which comprises:
  a first side, facing the opening, and
  an opposite second side, facing away from the opening, a first display device, which is arranged in the housing and which is configured to display a first video towards the first side of the semi-transparent mirror, and an artificial fireplace element, which is arranged in the interior of the housing, wherein the second side of the semi-transparent mirror faces the artificial fireplace element, wherein the semi-transparent mirror is arranged to at least partially reflect the first video at its first side and to at least partially transmit an image of the artificial fireplace element at its second side, in order to recombine the first video and the image of the artificial fireplace element into the artificial fire pattern, such that the artificial fire pattern is visible along the line of sight, characterized in that the artificial fireplace further comprises:

a digital storage device, wherein a first video of an actual fire pattern of a fire in an actual fireplace is at least temporarily stored on the digital storage device, and wherein the artificial fireplace is arranged to carry out the method for the displaying of the artificial fire pattern, as is described above.

The artificial fireplace according to the present invention is configured to display the artificial fire pattern by means of a Pepper's ghost projection. The artificial fireplace is thereby configured to display the first video towards the first side of the semi-transparent mirror, where the first video is to be at least partially reflected.

Along a line of sight, a user may see the artificial fire pattern, which is composed of an actual fire pattern from the first video and of the artificial fireplace elements. The user would see, along the line of sight, that the actual fire pattern from the first video would appear to originate from a location in the middle of the artificial fireplace, because the displayed first video is reflected by the semi-transparent, whereas the semi-transparent mirror is also transparent along the line of sight.

The artificial fireplace thereby provides for the possibility of displaying the first video in a hologram-like manner, in order to improve the realism of the artificial fireplace.

According to this embodiment of the artificial fireplace, the first display device may be arranged in the interior of the housing at a location above the semi-transparent mirror. With the term above, it is meant that in an installed configuration of the artificial fireplace, the first display device is arranged higher than the semi-transparent mirror, but at least partially in the same horizontal plane.

The first display device may be configured to display the flames in the first video in a downward direction onto the first side of the semi-transparent mirror, where the first video is at least partially reflected. The reflected first video emitted along the line of sight and a user may see the flames in the first video and the artificial fireplace element, as if an actual fire were to be present on the artificial fireplace element.

In an embodiment, the semi-transparent mirror of the artificial fireplace, comprises a transparent pane, for example a glass pane, a first coating that is provided on a first side of the pane and a second coating that is provided on a second side of the pane. The first side of the pane may correspond to the first side of the semi-transparent mirror and the first coating may be a reflective coating that is configured reflect light, in order to form the reflective first side of the semi-transparent mirror. The second side of the pane may correspond to the second side of the semi-transparent mirror and the second coating may be a transmitting coating that is configured transmit light, in order to form the transmitting second side of the semi-transparent mirror.

Alternatively or additionally, the semi-transparent mirror comprises a polarizing foil that is applied on the first surface of the mirror. The polarizing foil may for example comprise a microlouver layer, which comprises three-dimensional elements that together define a grid-like structure having apertures in between. The apertures allow for transmission of light in a range of directions substantially parallel to the apertures and provide for absorption of light that is non-parallel with the apertures. Accordingly, the polarizing foil may allow for transmission of the reflected first video of flames and the transmitted second video in a certain direction, e.g. along the line of sight and/or perpendicular to the plane of the semi-transparent mirror, and may allow for absorption of undesired light reflections in other directions, for example to prevent reflections of light from the surroundings, such as sun light or ceiling lights, of the fireplace to be visible.

In an embodiment, the semi-transparent mirror is, in an installed configuration of the artificial fireplace, set at a non-right angle with respect to a vertical direction. The semi-transparent mirror is set at an angle with the vertical direction that is in the range between 0° and 90°, but not being equal to 0° and 90°.

In an additional embodiment, the first side of the semi-transparent mirror at least partially faces in an upright direction. The upright direction is aligned parallel to an upward vertical direction. The first side of the mirror has a first line perpendicular to its plane, which has at least a component that is aligned in the upright direction. The first display device is arranged at least partially above the semi-transparent mirror and thereby faces the first side of the semi-transparent mirror. During use of the artificial fireplace, the first display device is configured to display the first video of flames in a downward direction, towards the first side of the semi-transparent mirror.

In an alternative embodiment, the orientation of the semi-transparent mirror may be reversed. In this embodiment, the second side of the semi-transparent mirror at least partially faces in an upright direction. The first side of the semi-transparent mirror thereby has a second line perpendicular to its plane, which has at least a component that is directed in a downwards vertical direction, opposite to the upright direction. In this embodiment, the first display device is arranged at least partially below the semi-transparent mirror. During use of the artificial fireplace, the first video of flames is displayed in the upright direction, towards the first side of the semi-transparent mirror.

In an embodiment, the non-right angle between the semi-transparent mirror and the vertical direction is between 25° and 65°, preferably between 35° and 55° and most preferable approximately 45°. With this preferred angle of 45°, the first display device may be arranged substantially horizontal to display the first video of flames in a downward vertical direction, towards the first side of the mirror and the second display device may be arranged vertical to display the second video in a horizontal direction, towards the second side of the mirror.

In an embodiment, the semi-transparent mirror is arranged over the entire width of the artificial fireplace, such that edges of the semi-transparent mirror substantially abut sidewalls of the housing of the artificial fireplace. Preferably, the edges of the semi-transparent mirror have been grinded, to obtain a thin and smooth edge of the semi-transparent mirror, in order to minimize the visibility of the edges of the semi-transparent mirror.

In an embodiment, the first side of the semi-transparent mirror has been treated locally, in order to achieve different amounts of reflection across its surface. With this embodiment, it may be achieved that reflections from objects outside the artificial fireplace on the first side of the semi-transparent are reduced. For example, reflections of a ceiling or light sources in a ceiling may be minimized. Preferably, the second side of the semi-transparent mirror has been treated locally accordingly, in order to achieve different amounts of transmission across its surface. As such, the amount of backlight may be further reduced, in order to improve the contrast of the flames in the first video and the second video, and to improve the quality of the artificial fire pattern that is displayed.

In an exemplary embodiment, the semi-transparent mirror may, in a mid-portion, be treated such, that the light in the artificial fire pattern is composed of 30% of transmitted light from the second video and of 70% of reflected light from the first video of flames. Towards the edges of the semi-transparent mirror, this ratio is changed towards 10% from the second video and 90% from the first video of flames. Preferably, a gradual change is provided between the ratios at the mid-portion and towards the edges.

In an embodiment, the housing of the artificial fireplace comprises a cross bar, which extends horizontally across the opening in the housing, thereby splitting the opening in two portions. As such, an upper portion of the opening is defined above the cross bar and a lower portion of the opening is defined below the cross bar. The cross bar forms a support for the semi-transparent mirror, which is configured to rest on the cross bar, Furthermore, the cross bar is arranged to cover a frontal edge of the mirror, since this edge is located behind the cross bar, when seen along the line of sight.

Compared to when only a first opening in the housing were to be provided, spanning upward from the frontal bottom edge of the mirror, the two openings with the cross bar provide for a higher combined opening in the housing. As such, the artificial fireplace becomes more realistic.

With the covered front edge of the mirror, the cross bar thereby provides the impression that no mirror is provided at all, since the front edge would normally be most visible. Furthermore, the separating of the opening by means of the cross bar provides that a user may look into the interior of the housing both through the upper portion and the lower portion of the opening. When a user would look through the upper portion, the displayed artificial fire pattern is visible, whereas looking through the lower portion allows the user to see the other elements in the interior of the artificial fireplace, such as artificial wooden logs, light reflections and flickering light.

In an embodiment, the artificial fireplace further comprises:

a second display device, which is arranged in the housing and which is configured to display a second video towards the second side of the semi-transparent mirror, wherein the semi-transparent mirror is further arranged to at least partially transmit the second video at its second side, in order to further recombine the artificial fire pattern with the second video, and wherein a second video of the actual fire pattern is at least temporarily stored on the digital storage device.

The artificial fireplace is thereby configured to display the second video towards the second side of the semi-transparent mirror, where the second video is to be at least partially transmitted, such that a resulting artificial fire pattern is to be formed that comprises the reflected first video and the transmitted second video.

Along the line of sight, a user may see an even more realistic artificial fire pattern, which is composed of an actual fire pattern from the first video and an actual fire pattern from the second video. The user would see, along the line of sight, that the actual fire pattern from the second video originates from the second display device and from a rear portion of the artificial fireplace. The user would further see that the actual fire pattern from the first video would appear to originate from a location in the middle of the artificial fireplace.

According to this embodiment, the displayed artificial fire pattern originates, or least appears to originate from different locations in the artificial fireplace. This may give rise to a layered effect in the displayed artificial fire pattern and to a more realistic appearance of the artificial fireplace.

In an embodiment, the first display device and/or the second display device are provided as a monitor, such as an LCD monitor. These monitors have the advantage that they are relatively thin and able to produce a sufficient amount of light, allowing the first video to be visible, despite being reflected by the semi-transparent mirror, and/or allowing the second video to be visible, despite being transmitted by the semi-transparent mirror. Preferably, the amount of backlight of the monitors is minimized in areas that surround the displayed flames in order to provide flames with a sufficient brightness and to improve the contrast of the flames in the first video and the second video.

In an embodiment, the artificial fireplace further comprises a controller, which is configured to align, seen along the line of sight, the first video and/or the second video with the artificial fireplace element. The controller may be configured to shift the position of the actual fire patterns within the videos. This means that, for example, the position of the flames in the first video could be shifted within a frame of the first video, so that the flames appear to originate from a different location, once displayed in the artificial fireplace. It is, as such, possible to adjust a position where a user would see the actual fire pattern in the first video and/or the second video, without requiring the shifting of the position from which the first video and/or the second video are displayed, e.g. without requiring the shifting of the first or second display device.

Alternatively, the artificial fireplace may lack a controller to align the first video and/or the second video with the artificial fireplace element. In this alternative fireplace, the artificial fireplace elements may be aligned with the first display device and/or the second display device during manufacturing. The position of the artificial fireplace element is furthermore safeguarded, in order to ensure the correct alignment during transportation and installation of the artificial fireplace.

In an embodiment of the artificial fireplace, the shape of the artificial fireplace element substantially corresponds to the shape of a physical fireplace element in the actual fireplace. The housing of the artificial fireplace may comprises a first alignment device, which is fixedly arranged in the interior of the housing, and the artificial fireplace element may comprise a complementary second alignment device, which is configured to mate with the first alignment device, in order to retain a relative position between the artificial fireplace element and the housing of the artificial fire pattern.

The artificial fireplace element may, for example, comprise a plurality of pins, which are arranged in a certain pin pattern. The pins may extend downwardly from element parts of the artificial fireplace element.

The artificial fireplace may comprise a corresponding amount of holes, which are arranged in the same pin pattern and which may have an inner diameter that corresponds to an outer diameter of the pins. The holes may, for example, be arranged in a grid in the housing of the artificial fireplace.

When the artificial fireplace element is arranged in the interior of the artificial fireplace, the pins are brought in the holes. The pins and holes have a complementary shape and only allow for one relative position between them. This one relative position corresponds to the aligned position of the artificial fireplace element in the housing of the artificial fireplace. As such, the relative position between the artificial fireplace element and the displayed first and/or second video may be ensured during use of the artificial fireplace.

In an embodiment, the artificial fireplace further comprises at least one first light source, which is arranged adjacent the artificial fireplace element and which is configured to illuminate the artificial fireplace element. The first light source may be provided as a strip of LEDs, which is arranged in a top portion of the housing and adjacent the first display device. The LED strip is configured to illuminate the artificial fireplace element, in order to improve their visibility. Hence, the artificial fireplace element is, seen along the line of sight, arranged behind the semi-transparent mirror and do not actively emit light. Without being illuminated, the artificial fireplace element may be too dark to be sufficiently visible through the semi-transparent mirror. Hence, in an actual fireplace, the artificial fireplace element would be illuminated by the flames. By illuminating the artificial fireplace element with the at least one first light source, the visibility of the artificial fireplace element is improved, which contributes to the realism of the artificial fireplace.

In an additional or alternative embodiment, the artificial fireplace further comprises a grid, which is arranged in the interior of the housing. The grid preferably spans the entire width of the artificial fireplace and is preferably elevated above a bottom portion of the housing. At the front of the fireplace, the grid may be flush with a bottom edge of the opening in the housing, in order to prevent that users will be able to see the components of the artificial fireplace that are arranged below the grid.

The grid comprises a lattice-like structure and a plurality of through openings, through which light may pass. The first side of the grid faces at least partly in an upward direction and the artificial fireplace element is arranged on the first side of the grid. As such, the artificial fireplace element is visible along the line of sight through the opening in the housing. In an embodiment, the openings are provided as physical through holes, which extend between a first side and a second side of the grid. In an alternative embodiment, the openings are no physical openings, but the grid may then comprise a transparent glass or plastic panel, which has masked areas to from the lattice-like structure and unmasked areas to form the openings.

In an embodiment, the artificial fireplace further comprises at least one second light source, which is arranged in the interior of the housing, and which faces an opposite second side of the grid. The at least one second light source is configured to provide the effect that the artificial fireplace element appears to glow, similar as the glowing of wooden logs in an actual fire. The at least one second light source is arranged below the artificial fireplace element so as to illuminate the artificial fireplace element from below.

In an embodiment, the artificial fireplace comprises a plurality of second light sources, which are spaced across the width of the artificial fireplace. The emitted light from the second light sources may have an orange or red colour, in order to mimic the actual effect of glowing wood. The second light sources may furthermore be configured to emit light of which the intensity varies over time. The changing intensity is intended to mimic glowing wood, since the intensity of glowing wood also fluctuates with time.

According to the present embodiment, the grid is arranged in between the second light sources and the artificial fireplace element. The emitted light from the second light sources thus first passes the openings in the grid, after which the artificial fireplace element is illuminated. The openings in the grid allow for transmission of the light, whereas the lattice-like structure blocks incident light and results in a shadow on the artificial fireplace element. The shadows of the grid create a carbonated effect on the artificial fireplace element, which makes it to resemble carbonized wooden logs.

In an embodiment, the artificial fireplace comprises a plurality of reflective elements, which are arranged on the first side of the grid and which are configured to reflect and scatter an incident light beam. The reflective elements may for example be glass fragments, which are spread across the grid, in particular where no artificial fireplace element is arranged. The reflective elements may be illuminated as well by the light that is emitted from the second light sources, which generates an effect of glowing embers in the artificial fireplace.

In an embodiment, the artificial fireplace comprises a sound device, which is configured to emit a sound signal. The sound signal may for example be the sound of a crackling fire, which is preferably synchronized with the flames in the first video and/or second video, in order to obtain an even more realistic effect to the user. Preferably, the volume of the emitted sound signal may be adjusted and the artificial fireplace may comprise a remote control device to change the volume of the emitted sound signal.

In an embodiment, the artificial fireplace comprises a heating device, which is configured to emit heat radiation. The heating device may be an electric heater, which may have vent openings that are arranged below and/or above the opening in the housing and which face towards any users in front of the artificial fireplace. Alternatively, the heating device may be incorporated in the artificial fireplace element and/or possible glass elements on the grid, which resemble glowing embers that normally produce heat in an actual fireplace, and may be configured to emit heat radiation through a glass window that is arranged in front of the opening in the housing of the artificial fireplace. As such, the realism of the artificial fireplace is improved.

Preferably, the emitted heat radiation accurately resembles the heat that is generated by an actual fire in an actual fireplace. Preferably, the temperature and/or intensity of the emitted heat radiation may be adjusted, preferably by means of the remote control device. Alternatively, the artificial fireplace may comprise a detector, which is configured to detect the presence of users in the proximity of the fireplace and which is configured to adjust the amount of generated heat on the basis of the presence of users.

Alternative or additional to the polarizing foil on the semi-transparent mirror, the first display device may comprise a polarizing foil. This polarizing foil on the first display device is configured to absorb light that is emitted in directions at relatively large angles with a normal direction of the first display device. Along these large angles, the displayed image may be ruled over by backlight to a large extent, giving rise to a blurred displayed image. By absorbing light in directions at these large angles, the amount of backlight emitted by the fireplace is reduced and the overall realism of the artificial fireplace is improved.

Alternatively or additionally, the second display device may comprise a similar polarizing foil to reduce the visibility of backlight in the displayed image.

In an embodiment, the first display device and/or the second display device is configured to display multiple different respective first videos and/or second videos. Each of the different videos may comprise flames that have a different height and/or flames that have a different intensity. As such, the flame height and/or intensity of the displayed artificial fire pattern may vary between different videos, allowing a user to display different types of flames.

Additionally, the artificial fireplace may comprise an input device, for example being embodied as a rotatable knob. The user may use the input device for selecting an appropriate artificial fire pattern that is to be displayed with the artificial fireplace. Accordingly, the input device may be used to select the flame height and/or intensity of the displayed artificial fire pattern, e.g. for selecting which of the multiple first videos and/or second videos are to be displayed by means of the first display device and/or second display device.

The input device may be a rotatable knob on the outside of the fireplace, which allows a user of the artificial fireplace to set a parameter for the artificial fire pattern that is to be displayed with the artificial fireplace. Alternatively, the input device may be a remote control device or may be a mobile communication device, such as a smartphone, on which an application is installed to control the artificial fireplace. The input device may for example be formed by one or more buttons on the remote control device or may be formed by a virtual slider in the application on the mobile communication device.

In an additional or alternative embodiment, the artificial fireplace further comprises at least one first light source, which is arranged adjacent the artificial fireplace element and which is configured to illuminate the artificial fireplace element. The first light source may be provided as a strip of LEDs, which is arranged in a top portion of the housing and adjacent the first display device. The LED strip is configured to illuminate the artificial fireplace element, in order to improve their visibility. Hence, the artificial fireplace element is, seen along the line of sight, arranged behind the semi-transparent mirror and does not actively emit light. Without being illuminated, the artificial fireplace element may be too dark to be sufficiently visible through the semi-transparent mirror. Hence, in an actual fireplace, the artificial fireplace element would be illuminated by the flames. By illuminating the artificial fireplace element with the at least one first light source, the visibility of the artificial fireplace element is improved, which contributes to the realism of the artificial fireplace.

The at least one first light source may be configured to illuminate the artificial fireplace element when the first display device and/or the second display device are deactivated, e.g. when no videos are displayed in the artificial fireplace. Since the artificial fireplace element is, seen along the line of sight, located behind the semi-transparent mirror, its visibility may normally be reduced due to the presence of the mirror. The illuminating of the artificial fireplace element may improve the visibility of the artificial fireplace element and may achieve the effect that the presence of the mirror is experienced less by the user, which allows that the realism of the artificial fireplace is improved and that it more accurately mimics an actual fireplace with a physical fireplace element, such as wooden logs, Here, the illuminating of the artificial fireplace element may comprise the illumination by means of emitted light that has a wavelength in the visible regime, for example having a wavelength spectrum that mimics daylight for resembling daylight that illuminates a physical fireplace element in an actual fireplace.

In a further embodiment, the at least one first light source is configured to illuminate the artificial fireplace element with a flickering effect. The flickering effect may for example comprise the illumination by means of emitted light that has a wavelength in the visible regime, for example having a red, orange or yellow colour for resembling the light that is emitted by actual flames in an actual fireplace. The flickering effect may alternatively or additionally comprise the varying of an intensity of the light that is emitted, in order to resemble the varying intensity of light that is emitted by actual flames in an actual fireplace.

The at least one first light source may, seen along the line sight, be arranged behind the semi-transparent mirror, such that its emitted light may illuminate the artificial fireplace element without being obstructed by any element in between the at least one first light source and the artificial fireplace element. For example, the at least one first light source can be embodied as a strip of LEDs across a substantial part of the width of the interior of the artificial fireplace, e.g. the entire width thereof. The strip of LEDs may be provided against the ceiling of the housing, behind the semi-transparent mirror, As such, the artificial fireplace element may be illuminated from across a substantial part of the overall width, in order to improve the realism of the illumination of the artificial fireplace element.

In an additional or alternative embodiment, the artificial fireplace further comprises a light sensor, which is configured to emit a light sensor signal that is representative for the intensity of the ambient lighting conditions outside the artificial fireplace. The light sensor may be disposed at the outside of the housing of the artificial fireplace, in order to allow for optimal detection of the ambient lighting conditions outside the artificial fireplace. The at least one first light source is, on the basis of the light sensor signal, configured to adjust an intensity of light that is emitted with the at least one light source. The at least one first light source may thereto be connected to the light sensor and may comprise a control unit for adjusting the intensity of the emitted light.

As a result of the adjusting of the light from the at least one first light source, the illumination of the artificial fireplace element in the interior of the housing becomes adjusted, which causes a change in visibility of the artificial fireplace element. This change may be necessary to allow the artificial fireplace element to be visible behind the semi-transparent mirror for all ambient lighting conditions, since the semi-transparent mirror may reduce the normal visibility of the artificial fireplace element.

For example during daylight conditions, reflections of the ambient light on the semi-transparent might reduce the visibility of the artificial fireplace element. The light sensor signal may be relatively high and may provide that the at least one first light source will emit light at a relatively high intensity. In the absence of daylight, on the other hand, the ambient lighting conditions may be less intense, resulting in a low light sensor signal. Accordingly, the at least one first light source will be configured to emit light at a relatively low intensity.

Furthermore, the at least one light source may be configured to also emit light when the first display device and/or the second display device are deactivated and when thus no videos are displayed. This may provide the advantage that the artificial fireplace element is also illuminated when not artificial fire is displayed. This increases the visibility of the artificial fireplace element when the artificial fireplace is not activated, despite the presence of the semi-transparent mirror in between them, in order to more accurately mimic an actual fireplace in which no actual fire is present.

Figure 4A:
Figure 4B:
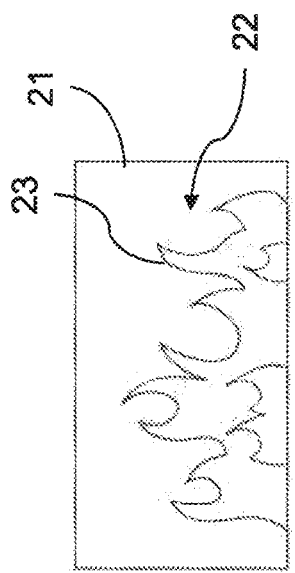
Figure 4C:
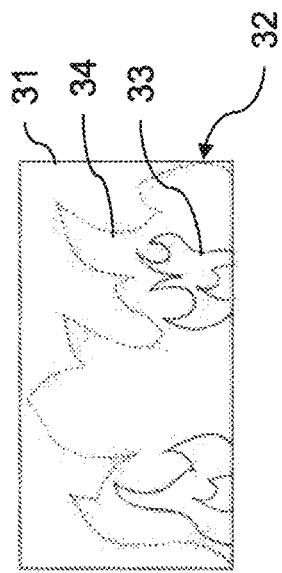

Further characteristics of the invention will be explained below, with reference to embodiments, which are displayed in the appended drawings, in which:

FIG. 1 schematically depicts an embodiment of the artificial fireplace according to the present invention, FIG. 2a depicts a section view on the fireplace of FIG. 1, FIG. 2b depicts an embodiment of a first light beam with the first video of flames and of a second light beam with the second video, FIG. 3a depicts a cross-sectional view on the fireplace of FIG. 1, FIG. 3b depicts an artificial fireplace element, FIGS. 4A-4C depict an embodiment of the recorded video, a first light beam with the first video of flames and a second light beam with the second video, and FIGS. 5A-5l depict an embodiment of a method for the displaying of an artificial fire pattern with an artificial fireplace.

Throughout the figures, the same reference numerals are used to refer to corresponding components or to components that have a corresponding function.

FIG. 1 schematically depicts an embodiment of the artificial fireplace according to the present invention, to which is referred with reference numeral 1. The artificial fireplace 1 comprises a housing 2, in which an opening 3 is provided. The housing 1 defines an interior 4 and the opening 3 is configured to provide access into the interior 4. The opening 3 is arranged at the front of the housing 2 and allows a line of sight (S) into the interior 4 of the housing 2. In the figures, the line of sight (S) is displayed be aligned in a horizontal direction, but any line along which users may look into the interior 4 of the housing 2 may be regarded as a line of sight.

In the present embodiment, the opening 3 in the housing 2 is covered with a glass pane. The glass pane is transparent for light in the visual regime, and thus allows a user to look into the interior 4 of the housing 2. Alternatively, the glass pane may also be omitted to reduce any disturbance upon looking into the interior 4 of the housing 2.

The artificial fireplace 1 further comprises a semi-transparent mirror 10, which is arranged in the interior 4 of the housing 2. The mirror 10 can also be seen in FIGS. 2 and 3. The semi-transparent mirror 10 is set at a non-right angle with respect to a horizontal direction (H) and a vertical direction (V). In the present embodiment, the angle is set at 45°. The semi-transparent mirror 10 is fixed with respect to the housing 2. At the front of the housing 2, the mirror 10 is mounted in a cross bar 11, which extends across the width of the housing 2 and in front of the opening 3 in the housing 2. The cross bar 11 is further arranged to cover a frontal edge of the mirror 10, in order to give the impression that no mirror 10 is provided at all.

The semi-transparent mirror 10 comprises a first side 12, which faces the opening 3 in the housing 2 and which is partly aligned in an upward vertical direction as well. The first side 12 of the mirror 10 is configured to at least partially reflect a video that is displayed towards it.

The semi-transparent mirror 10 comprises a second side 13, which is arranged opposite to the first side 12, and which faces the away from the opening 3. The second side 13 is partly aligned in a downwards vertical direction as well. The second side 13 of the mirror 10 is configured to at least partially transmit a video that is displayed towards it.

The mirror 10 is configured to transmit the beam from its second side 13 towards the first side 12. At the first side 12, the transmitted beam from the second side 13 and the reflected beam from the first side 12 are recombined and a combined beam is emitted from the first side 12. Due to the orientation of the mirror 10 at 45° with respect to the vertical direction (V) and the horizontal direction (H), the first display device 20 may be arranged substantially horizontally, configured to display the first video of flames in the downward vertical direction (V) and the second display device 30 may be arranged substantially vertically, configured to display the second video in the horizontal direction (H).

The artificial fireplace 1 comprises a first display device 20, which is arranged in the interior 4 of the housing 2 at a top portion of the housing 2. In the present embodiment, the first display device 20 is provided as a flat-screen monitor 20, which is configured to emit a first light beam 21 in the downward vertical direction (V). The first light beam 21 is thereby projected onto the first side 12 of the semi-transparent mirror 10, where it is at least partially reflected thought the opening 3 in the housing 2. The first video of flames 22 may be comprised in the emitted first light beam 21, such that the emitting of the first light beam 21 by the first display device 20 corresponds to the displaying of the first video of flames 22.

The artificial fireplace 1 further comprises a second display device 30, which is arranged in the interior 4 of the housing 2, at a rear portion thereof. The second display device 30 is, in the present embodiment, a flat-screen monitor 30 as well, which extends in the vertical direction (V). The second display device 30 is configured to emit a second light beam 31 in the horizontal direction (H), onto the second side 13 of the semi-transparent mirror 10, where the second light beam 31 is at least partially transmitted towards the first side 12 of the mirror 10. The second video 32 may be comprised in the emitted second light beam 31, such that the emitting of the second light beam 31 by the second display device 30 corresponds to the displaying of the second video 32.

The mirror 10 is configured to recombine the first light beam 21 and the second light beam 31, and to transmit this combined beam through the opening 3, along the line of sight (S). Since the first light beam 21 is reflected on the first side 12 of the mirror 10, it appears, when seen along the line of sight (S), that the first light beam 21 originates from a virtual vertical plane 21' that intersects the mirror 10. In FIG. 3a, this virtual vertical plane 21' is indicated by the dashed line.

The second light beam 31 originates from the second display device 30 and is emitted in the horizontal direction (H), which is substantially parallel to the line of sight (S). Also for users, which look into the housing 2 though the opening 3 and along the line of sight (S), the second light beam 31 appears to originate from the rear portion of the housing 2, whereas the first light beam 21 appears to originate from the virtual vertical plane 21'. For the user, it thus appears that there is a spacing Δ in between the projections of the first light beam 21 and the second light beam 31. In FIG. 2b, this spacing Δ between the light beams 21, 31 is shown schematically.

In this embodiment of the artificial fireplace 1, the first light beam 21 comprises the first video of flames 22 and the second light beam 31 comprises the second video of flames 32. Both videos have been extracted from a recorded video of an actual fire and thus form an accurate display of flames. Alternatively, the first video and second video may also be rendered videos of a virtual fire, which can, for example, be rendered real-time by a controller of the artificial fireplace.

The artificial fireplace 1 further comprises a grid 40, which is arranged in the interior 4 of the housing 2. The grid 40 extends at least partially in the horizontal direction (H) and has a lattice-like structure, defining through openings. The grid 40 has a first side 41, which faces at least partially in the upwards vertical direction. A front portion of the grid 40 is slightly bent in a downwards direction and extends towards a bottom edge of the housing 2, adjacent the opening 3.

The artificial fireplace 1 comprises an artificial fireplace element 50, which comprises a plurality of element parts, which are arranged in a stacked configuration and which are arranged in the interior 4 of the housing 2 as well. The artificial fireplace element 50 resembles a physical fireplace element in an actual fireplace and resembles, in the present embodiment of the artificial fireplace 1, stacked wooden logs in a wood fire.

The artificial fireplace element 50 is arranged on the grid 40 and the element parts are stacked, in order to resemble actual wooden logs. The artificial fireplace element 50 is arranged in between the semi-transparent mirror 10 and the second display device 30 and the second side 13 of the mirror 10 faces the artificial fireplace element 50.

It is displayed in FIG. 3b that a frontal surface 51 of at least one of the element parts of the artificial fireplace element 50 is aligned parallel to the virtual vertical plane 21' of the first light beam 21. This at least one element part does therefore not intersect with the virtual vertical plane 21', and the vertical frontal surface 51 allows for accurate focusing of the first light beam 21 and allow a user to experience the flames in the first video 22 to appear to originate from the first vertical plane 21'.

The artificial fireplace element 50 is arranged in between the virtual vertical plane 21', from which the first light beam 21 appears to originate, and the second display device 30, from which the second light beam 31 originates. Both light beams 21, 31 comprise videos of flames 22, 32, such that a three-dimensional flame effect is achieved. Hence, it appears that there are flames both in front of or on the artificial fireplace element 50 and behind the artificial fireplace element 50.

The artificial fireplace 1 further comprises a light source, which is in the present embodiment embodied as a strip of LEDs 52 that is arranged in the interior 4 of the housing 2, at the top portion thereof. The strip of LEDs 52 extends over substantially the entire width of the housing 2 and is configured to illuminate the artificial fireplace element 50 that is arranged below. As such, the illuminated artificial fireplace element 50 has, for the users, an improved visibility within the interior 4 of the housing 2. The fireplace 1 further comprises a shielding 53, which is arranged in front of the strip of LEDs 52 and which is configured to prevent the emitted light from the strip of LEDs 52 from directly reaching the opening 3 in the housing 2.

The artificial fireplace 1 further comprises a plurality of second light sources 54, which are arranged in the interior 4 as well. The second light sources comprise a plurality of lamps 54, which extend over the width of the housing 2 and which are spaced with respect to each other. The lamps 54 are arranged below the grid 40 and face toward a second side 42 of the grid 40, which is arranged opposite to the first side 41 and which faces at least partially in a downwards direction.

The lamps 54 are configured to illuminate the artificial fireplace element 50 as well. The light from the lamps 54 passes through the openings in the grid 40 and shines on the artificial fireplace element 50. The lattice of the grid 40 causes a grid-like shadow on the artificial fireplace element 50, since only the light that passes through the openings in the grid 40 reaches the artificial fireplace element 50. This grid-like shadow creates a carbonated effect on the artificial fireplace element 50, which makes element parts to resemble carbonized wooden logs.

Preferably, the lamps 54 emit light in the visible regime, having a wavelength that corresponds to a light colour in the spectrum between red and yellow, to resemble a glowing effect of the artificial fireplace element 50. The lamps 54 are controlled by a controller 62 to emit light with an intensity that varies over time, in order to achieve an even more realistic glowing effect of the artificial fireplace element 50. The controller 62 is configured to synchronize the changes in intensity with the pattern of flames that is displayed in the first and second videos 22, 32 in the first and second light beams 21, 31.

In between the bottom edge of the opening 3 in the housing 2 and the cross bar 11, a lower portion 3' of the opening 3 allows a user to look at a portion of the grid 40. Here, the light from the lamps 54 is visible as well. Preferably, but not displayed in the figures, comprises the artificial fireplace 1 a large amount of reflective scattering elements, which are arranged on the first side 41 of the grid 40. The reflective elements may for example be glass fragments, which are configured to reflect and scatter incident light beams. The glass elements are configured to reflect and scatter the light that is emitted by the lamps 54, coming from below through the openings in the grid 40, in order to resemble glowing embers on the grid 40. These glass elements are visible through the lower portion 3' and provide that the artificial fireplace 1 resembles an actual fireplace even more realistically.

The artificial fireplace further comprises a sound device 60 and a heating device 61. The sound device 60 is arranged on top of the housing 2 and is configured to emit a sound signal that resembles the sound of an actual wood fire in an actual fireplace. The heating device 61 is arranged in the interior 4 of the housing 2, below the opening 3, and is configured to emit heat radiation. The emitted heat radiation mimics the heat that is generated by an actual fire in an actual fireplace and may serve the purpose of creating a more realistic artificial fireplace 1, but may even contribute in heating a room in which the artificial fireplace 1 were to be installed. Preferably, the housing 2 comprises vent holes at its front, below the opening 3, in order to allow the escape of the heat radiation from the heating device 61. In the embodiment that is shown the figures, the sound device 60 is located above the opening 3 and the heating device 61 is arranged below the opening 3. According to the present invention, the sound device and the heating device may as well be located at other positions in the artificial fireplace.

The artificial fireplace 1 further comprises a controller 62 and a digital storage device 63. The controller 62 is electrically connected to the first display device 20 and to the second display device 30 and is configured to control the display devices 20, 30. The controller 62 is furthermore connected to the storage device 63. The storage device 63 comprises at least the first video 22 and the second video 32, which are stored on the storage device 63. The storage device 63 is, in the present embodiment, provided as a media player, which is connected to the display devices 20, 30 in order to emit the light beams 21, 31 with the videos 22, 32.

The storage device 63, with the first video 22 and the second video 32 stored thereon, and the artificial fireplace element 50 together form a fireplace element assembly. In case the user is interested in a different artificial fire pattern of the artificial fireplace 1, he or she may provide a different fireplace element assembly and may replace the artificial fireplace element 50 of the present assembly with the artificial fireplace element of the replacement assembly, which may have element parts that are stacked in a different configuration. The storage device of the replacement assembly comprises different first and second videos, which correspond to the artificial fireplace element of the replacement assembly. Preferably, the videos on the storage device of the replacement assembly have been extracted from a recorded video of an actual fire in which that physical fireplace element was arranged similarly as the artificial fireplace element of the replacement assembly. When these different videos are projected in the first and second light beams, the artificial fire pattern that is generated by the artificial fireplace changes and the user can have a different fireplace impression, without having to replace the entire artificial fireplace 1.

FIG. 4a depicts an example of a recorded video of an actual fire in an actual fireplace. The actual fire can be a wood fire, but in the current embodiment, the actual fire is a gas fire. In the present embodiment, the recorded video is recorded from an actual gas fire on a physical fire element that represents wooden logs, as if the actual gas fire actually were a wood fire.

After the video has been recorded, a first video 22 and a second video 32 are extracted therefrom. This extraction is, at least in the present embodiment, carried by means of appropriate software that allows a user to spread the contents of a single video over multiple videos.

The single recorded video comprises all flames that are present in the actual fireplace. By means of the extraction, flames from different areas in the actual fire may be isolated in order to form multiple videos, which each comprise an image of the flames at a different area in the actual fireplace.

In FIG. 4b, the emitted first light beam 21 is displayed, which comprises the first video 22. The first video 22 is extracted from the recorded video and comprises recorded flames 23 that originate from a first area in the actual fire. This first area is generally chosen to be an area that is, when seen along a line of sight, located at a front part of the actual fire and of the physical fireplace element and which is, in the present embodiment, aligned perpendicular to the line of sight. Hence, when the first video 22 is displayed in the artificial fireplace 1, it appears that the flames 23 therein originate from the virtual vertical plane 21', which is arranged at a front part of the artificial fireplace element 50.

In FIG. 4c, the emitted second light beam 31 is displayed, which comprises the second video 32. The second video 32 is extracted from the recorded video as well and comprises recorded flames 33 that originate from a second area in the actual fire. The second area in the actual fire is spaced from the first area and is, when seen along the line of sight, arranged at a rear part of the actual fire and of the physical fireplace element. The second plane is, in the present embodiment, aligned perpendicular to the line of sight as well.

During use of the artificial fireplace 1, the second video 32 is projected from the second display device 30, which is arranged behind the artificial fireplace element 50. It thereby also appears that the flames 33 in the second video 32 also originate from behind the artificial fireplace element 50.

The second video 32 not only comprises the recorded flames 33, but also comprises a video 34 of a glow effect on a background of the physical fireplace, which is extracted from the recorded video as well. This video of the glow effect 34 comprises the glow effect of the background of the actual fireplace, being illuminated by the flames of the actual fire. In FIG. 4c, the glow effect is indicated by the dashed line.

The first video 22 and the second video 32 are stored on the storage device 63 of the artificial fireplace 1 and the controller 62 is configured to control the first display device 20 to emit the first light beam 21 with the first video 22 and to control the second display device 30 to emit the second light beam 31 with the first video 32.

The storage device 63 furthermore comprises a plurality of further first videos and further second videos. The further first videos and second have been extracted from a recorded similarly as the first video 22 and the second video 32, but the respective recorded videos have been recorded of an actual gas fire having a different gas fire setting. In the present embodiment, the gas fire setting is a setting for the amount of gas supply towards the actual gas fire. A high gas fire setting corresponds to a large gas supply and a high intensity of the actual gas fire, whereas a low gas fire setting corresponds to a small gas supply and a low intensity of the actual gas fire.

For obtaining of the further first second videos, first, a gas fire setting is stored. Then, a respective video is recorded, which is extracted in a respective first video and second video, which are stored and are linked to the respective gas fire setting.

The artificial fireplace 1 comprises an input device. In the present embodiment, the input device may be a rotatable knob 64, which is connected to the controller 62. The knob 64 allows a user of the artificial fireplace 1 to set a parameter for the artificial fire pattern that is to be displayed with the artificial fireplace 1. In an alternative embodiment, the input device may be a remote control device or may be a mobile communication device, such as a smartphone, on which an application is installed to control the artificial fireplace. The input device may for example be formed by one or more buttons on the remote control device or may be formed by a virtual slider in the application on the mobile communication device.

The parameter may for example represent an intensity of the displayed artificial fire pattern. The controller 62 is configured to select the one of the gas fire settings for the actual gas fire that are associated with the set parameter. Subsequently, the controller 62 is configured to select the respective first video 22 and second video 32 that corresponds to the selected gas fire setting and is configured to control the first display device 20 to emit a first light beam 21 that comprises that respective first video 22 and to control the second display device 30 to emit a second light beam 31 that comprises that respective second video 32.

It may, however, as well occur that the set parameter does not correspond to a certain gas fire setting of the actual gas fire, but that it corresponds to a setting in between two consecutive gas fire settings. In this situation, the controller 62 may further be configured to control the first display device 20 to emit a first light beam 21 with a combination of first videos 22 and to control the second display device 30 to emit a second light beam 31 with a combination of second videos 32. The combination of first videos 22 may thereby be formed by a weighted average of the first videos 22 that corresponds to the consecutive gas fire settings and the combination of second videos 32 may be formed accordingly by a weighted average of the second videos 32 that corresponds to the consecutive gas fire settings as well.

The storage device 63 further comprises, for each of the gas fire settings, a setting value for the heating device 61. The heating output of the heating device 61, at a certain heating setting, preferably corresponds to the amount of heat that is generated by the actual gas fire at the corresponding gas fire setting. As such, the heating device 61 is configured to generate a realistic amount of heat that corresponds to the artificial fire pattern that is displayed by the actual fireplace 1.

Alternatively, the actual fire in the actual fireplace may also be a wood fire, which may be subject to certain conditions, such as a certain air flow towards the fire. The conditions for the wood fire may thereby form the fire settings, at least in case the fire in the actual fireplace were to be a wood fire.

The artificial fireplace 1 is configured to display an artificial fire pattern 70. A schematic representation of the artificial fire pattern 70 is visible in the artificial fireplace 1 in FIG. 2a. The artificial fire pattern 70 is, at least in the present embodiment, provided by the first light beam 21 and the second light beam 31. The first light beam 21 thereby comprises a first video 22, comprising recorded flames 23, and the second light beam 31 comprises a second video 32, comprising recorded flames 33.

For providing the first video 22 and the second video 32, a video is recorded of an actual fire pattern of an actual fire. In FIG. 5, the process of the providing of the videos 22, 32 and the displaying of the artificial fire pattern 70 is schematically displayed.

First, a physical fireplace element 101, comprising a plurality of stacked physical element parts, is arranged in an actual fireplace 100, or an actual fireplace is provided in which the physical fireplace element is already arranged. Preferably, the element parts of the physical fireplace element 101 are interconnected in order to assure their relative positions and to assure the position of the physical fireplace element 101 within the actual fireplace 100. The physical fireplace element may, in an embodiment, comprise wooden logs. In the present embodiment, the physical fireplace element 101 are provided as flame-resistant imitation logs 101, which resemble actual wooden logs, but which are able to resist heat.

The element parts of the physical fireplace element 101 are provided with gas channels, through which a flammable gas is guided. At the ends of these channels, the gas may escape into the actual fireplace 100 and is ignited in order to create an actual gas fire 102 on the physical fireplace element 101. The flames of the actual gas fire 102 form an actual fire pattern 103 on the physical fireplace element 101. The actual gas fire 102 and corresponding actual fire pattern 103 are displayed in FIG. 5b.

The actual fire pattern 103 varies with respect to the depth in the actual fireplace 100, parallel to a line of sight and perpendicular to the plane of FIG. 5. At the front of the actual fireplace 100, a first area 100' is located. Towards the rear of the actual fireplace 100, a second area 100" is located. The second area 100" is, when seen perpendicular to the plane of FIG. 5, set a distance from the first area 100', e.g. towards the back of the actual fireplace 100.

The first area 100' and second area 100" may be defined as regions in the actual fire 102, which span along a distance into the physical fireplace 100, seen along the line of sight. The first are 100' is thereby provided in a proximal depth region in the actual fire 102 and the second area 100" in the actual fire 102 corresponds to a distal depth region in the actual fire 102.

For the providing of the first video 22 and the second video 32, first, a video is recorded from the actual fire pattern 103 in the actual fireplace 101. In FIG. 5b, an image is displayed which represents the recorded video.

The recorded video is extracted into a first video 22, which comprises flames that originate from the first area 100' and which form a respective actual fire pattern 103'. In FIG. 5c, an image is displayed which represents the extracted first video 22. The recorded video is further extracted into a second video 32, which comprises flames that originate from the second area 100" and which form a respective actual fire pattern 103". In FIG. 5d, an image is displayed which represents the extracted second video 32.

The recorded first video 22 and second video 32 are stored on the storage device 61 of the artificial fireplace 1.

In the actual fireplace 100, the gas fire setting may be changed in order to change the gas supply and to increase or decrease the intensity of the actual gas fire 102. For each of the gas fire settings, a video may be recorded of the actual fire pattern at both the first area 100' and the second area 100". The corresponding extracted first videos 22 and second videos 32 are stored together with their respective gas fire settings on the storage device 63 of the artificial fireplace 1.

In FIG. 5e, element parts of the artificial fireplace element 50 are shown, which are arranged in an interior 4 of an artificial fireplace 1. For the displaying of the artificial fire pattern 70, first, the artificial fireplace element 50 is positioned in the interior 4, such that its position corresponds to the position of the physical fireplace element 101 in the actual fireplace 100. This adapting may comprise the arranging of the individual element parts of the artificial fireplace element 50 with respect to each other, but may also comprise moving of the artificial fireplace element 50 itself, e.g. in the entire stacked configuration. The double-sided arrow in between the drawings in FIG. 5e indicates the comparison between the position of the physical fireplace element 101 in the physical fireplace 100 and the position of the artificial fireplace element 50 in the interior 4 of the artificial fireplace 1.

Preferably, the element parts of the artificial fireplace element 50 are connected to each other in a stacked configuration that corresponds to the stacked configuration of the element parts of the physical fireplace element 101 in the actual fireplace 100. More preferable, the artificial fireplace element 50 comprises an alignment portion, which is configured to mate with an alignment portion in the artificial fireplace 1 in order to ensure correct positioning of the artificial fireplace element 50 in the artificial fireplace 1.

Then, the first light beam 21 may be tuned in the artificial fireplace 1, in order to shift a position of the first video 22 with the first light beam 21. The first light beam 21 is adjusted such that, when seen along the line of sight (S) into the artificial fireplace 1, the first video 22 is aligned with the artificial fireplace element 50 in the interior 4 of the artificial fireplace 1. This step of tuning of the first light beam 21 is schematically displayed in FIG. 5f.

Upon tuning, the flames in the first video 22 become aligned with the artificial fireplace element 50, as if they actually originated from the artificial fireplace element 50 in the artificial fireplace 1, instead of originating from the physical fireplace element 101 in the actual fireplace 100.

In the present embodiment, the same may be done for the second light beam 31, which comprises the second video 32. The second light beam 31 is tuned as well, in order to align the flames in the second video 32 with the artificial fireplace element 50, so that it appears that the flames in the second video 32 actually originate from the artificial fireplace element 50 in the artificial fireplace 1, instead of originating from the physical fireplace element 101 in the actual fireplace 100. This step of tuning of the second light beam 31 is schematically displayed in FIG. 5g.

The tuning of the first light beam 21 and of the second light beam 31 may be done by tuning of the first display device 20 and the second display device 30, so as shift the position from the which the first light beam 21 and the second light beam 31 are emitted. Preferably, this shifting of the emitting position on the first display device 20 and the second display device 30 is controlled by means of the controller 62 of the artificial fireplace 1. Alternatively or additionally, the first display device 20 and the second display device 30 may be shifted in their entirety with respect to the artificial fireplace element 50 in order to shift the first light beam 21 and the second light beam 31.

By tuning of the first light beam 21 and the second light beam 31 in the artificial fireplace 1, the displayed first video 22 and second video 32 are aligned with the artificial fireplace element 50, so that the first video 22, second video 32 and the artificial fireplace element 50 along the line of sight (S) together form an artificial fire pattern 70 that resembles the actual fire pattern 103 in the actual fireplace 100, as is displayed in FIG. 5h.

In an additional embodiment of the method, the second video 32' further comprises a glow effect 104 on the background in the actual fireplace 100. This is schematically displayed in FIG. 5i, in which it is shown that the second video represents an actual fire pattern 103" on the second area 100" in the actual fireplace 100 and a glow effect 104 on a background of the actual fireplace 100.

Figure 5I:
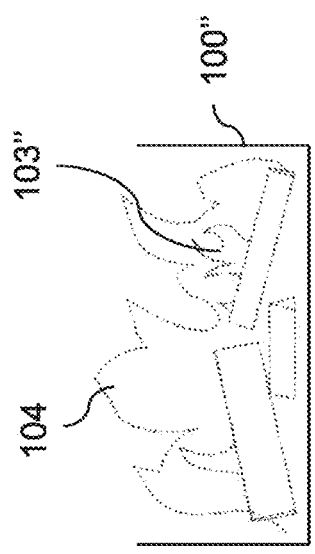
Figure 5J:
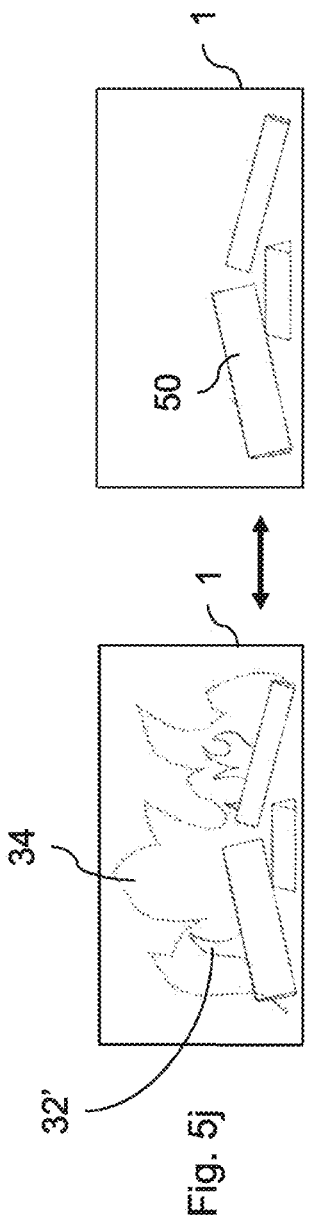
Figure 5K:
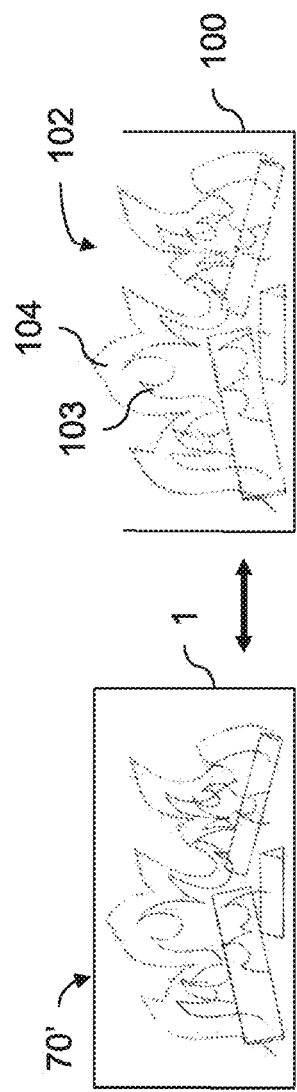

The tuning of the second light beam 21 with the second video 32' now also comprises the adjusting of the position of the glow effect 34 with respect to the artificial fireplace element 50 in the artificial fireplace 1, as is schematically displayed in FIG. 5j. Hence, the glow effect 34 forms part of the second video 32', so when the second light beam 31 is tuned to adjust a position of the flames 33 in the second video 32', the position of the glow effect 34 is automatically adjusted accordingly. In FIG. 5k, the glow effect 34 is shown to be aligned in the artificial fireplace 1 as well, forming part of the artificial fire pattern 70'.

In a further additional embodiment, as displayed in FIG. 5l, the first video 22' further comprises an additional animation 35. The additional animation 35 is, in the present embodiment, a cartoon figure. However, the additional animation may as well comprise advertising content or the like, or may comprise additional images or videos to, for example, adapt the displayed artificial fire pattern to the surroundings of the artificial fireplace 1. The additional image or video may thereto, for example, comprise a colouring that corresponds to a colour pattern outside the artificial fireplace 1.

The invention claimed is:

1. Method for displaying an artificial fire pattern in an artificial fireplace, the artificial fireplace comprising:
   a housing, defining an interior and comprising at least one opening to allow a line of sight into an interior of the housing,
   a digital storage device, for storing at least temporarily a first video,
   a first display device, which is arranged in the interior of the housing and which is configured to display the first video,
   an artificial fireplace element, which is arranged in the interior of the housing,
   wherein the artificial fireplace is arranged to recombine the first video and the artificial fireplace element into the artificial fire pattern, such that the artificial fire pattern is visible along the line of sight,
   wherein the method comprises the steps of:
   providing a plurality of first videos each comprising flames and being free of images of a physical fireplace element and wherein each has been extracted from respective recorded videos of a fire at multiple different fire settings representing multiple different flame heights and/or sizes and/or intensities,
   setting at least one parameter for the artificial fire pattern,
   selecting one or more fire settings that correspond to the at least one set parameter,
   selecting one or more of the plurality of first videos that are associated with the selected one or more fire settings,
   processing the selected one or more first videos to form a combined first video,
   storing the combined first video at least temporarily on the digital storage device,
   arranging an artificial fireplace element in the interior of the artificial fireplace, wherein the shape of the artificial fireplace element substantially corresponds to the shape of the physical fireplace element in the actual fireplace, and displaying the combined first video in the artificial fireplace, to create the artificial fire pattern, wherein the flames in the combined first video are, seen along a line of sight, aligned with the artificial fireplace element, such that the artificial fire pattern substantially resembles the actual fire pattern.

2. Method according to claim 1, further comprising the step of:

processing the first video to adapt the position of the actual fire pattern in the first video, in order to align the first video, seen along the line of sight, with the artificial fireplace element.

3. Method according to claim 1, further comprising the step of illuminating the artificial fireplace element from above with at least one first light source arranged above the artificial fireplace element.

4. Method according to claim 3, wherein the illuminating of the artificial fireplace element comprises the illuminating with a flickering effect.

5. Method according to claim 3, further comprises the steps of emitting, with a light sensor of the artificial fireplace, a light sensor signal that is representative for the intensity of the ambient lighting conditions outside the artificial fireplace, and adjusting, on the basis of the light sensor signal, an intensity of light that is emitted with the at least one first light source.

* * * * *